United States Patent
Ting et al.

(10) Patent No.: US 11,731,996 B2
(45) Date of Patent: Aug. 22, 2023

(54) HIGH-ENTROPY COMPOSITE GLYCERATE, METHODS FOR PREPARING THEREOF AND ELECTROCATALYSTS COMPRISING THE SAME

(71) Applicant: National Cheng Kung University, Tainan (TW)

(72) Inventors: Jyh-Ming Ting, Tainan (TW); Thi Xuyen Nguyen, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 17/501,785

(22) Filed: Oct. 14, 2021

(65) Prior Publication Data
US 2022/0402957 A1    Dec. 22, 2022

(30) Foreign Application Priority Data

Jun. 16, 2021    (TW) .................................. 110121929

(51) Int. Cl.
| | | |
|---|---|---|
| *C07F 19/00* | (2006.01) | |
| *C25B 11/048* | (2021.01) | |
| *C25B 1/04* | (2021.01) | |

(52) U.S. Cl.
CPC ............ *C07F 19/00* (2013.01); *C25B 11/048* (2021.01); *C25B 1/04* (2013.01)

(58) Field of Classification Search
CPC .................. B01J 31/4076; B01J 37/348; B01J 2219/00713; C07F 15/04; C07F 11/00; C07F 11/005; C07F 15/06; C07F 15/02; C07F 13/00; C07F 13/005
See application file for complete search history.

(56) References Cited

U.S. PATENT DOCUMENTS

| | | | | |
|---|---|---|---|---|
| 2012/0217169 A1* | 8/2012 | Long | ................. | C25B 1/04 205/637 |
| 2014/0042035 A1* | 2/2014 | Maayan | ............... | B01J 31/2226 205/628 |
| 2015/0065339 A1* | 3/2015 | Bloomfield | ............. | C07F 11/00 568/376 |
| 2015/0101936 A1* | 4/2015 | Chiang | .................. | B01J 31/226 205/637 |
| 2015/0151289 A1* | 6/2015 | Mikhailine | ............... | C07F 9/46 564/92 |
| 2018/0008969 A1* | 1/2018 | Zhang | .................. | B01J 31/2239 |
| 2020/0290031 A1* | 9/2020 | Zhang | ..................... | B01J 31/22 |
| 2020/0354845 A1* | 11/2020 | Mu | ........................ | C25B 11/095 |
| 2021/0155649 A1* | 5/2021 | Lang | ........................ | C07F 15/04 |
| 2021/0395182 A1* | 12/2021 | Yeh | ........................ | C07F 11/005 |

OTHER PUBLICATIONS

T. Liu et al., 13 Nano Research (2020) (Year: 2020).*
C. Oses et al., 5 Nature Reviews—Materials (2020) (Year: 2020).*
T. Nguyen et al., 8 Advanced Science (2021) (Year: 2021).*
S. Babu et al., 14 ChemCatChem (2022) (Year: 2022).*
X. Wang et al., Journal of Materials Chemistry A, 663-701 (2021) (Year: 2021).*
B. Wang et al., 20 Entropy, (2018) (Year: 2018).*
H. Huo et al., 3 Tungsten, 161-180 (2021) (Year: 2021).*
Nguyen, Thi Xuyen, et al. "A new high entropy glycerate for high performance oxygen evolution reaction." Advanced Science 8.6 (Jan. 27, 2021): 2002446.

* cited by examiner

*Primary Examiner* — Alexander R Pagano
(74) *Attorney, Agent, or Firm* — Fox Rothschild LLP

(57) ABSTRACT

Provided is a high-entropy composite glycerate represented by NiCrFeCoMn($C_3H_5O_4$)$_n$ and an electrocatalyst thereof, wherein n is a positive integer from 1 to 3, and wherein each of the Ni, Cr, Fe, Co and Mn includes an atom percent of 5 to 35 based on the total amount of the Ni, Cr, Fe, Co and Mn. Each of the metals is homogenously distributed within the high-entropy composite glycerate, and the high-entropy composite glycerate can reduce an overpotential for oxygen evolution reaction by the synergistic effect resulting from the structure formed by the quinary-metal glycerate. The high-entropy composite glycerate is suitable for catalyzing oxygen evolution reaction, and therefore has a prospect for application. Methods for preparing the high-entropy composite glycerate are also provided.

10 Claims, 18 Drawing Sheets

HIGH-ENTROPY COMPOSITE GLYCERATE, METHODS FOR PREPARING THEREOF AND ELECTROCATALYSTS COMPRISING THE SAME

This Application claims priority from Application 110121929 filed on Jun. 16, 2021 in Taiwan. The entire contents of these applications are incorporated herein by reference in their entirety.

BACKGROUND

1. Technical Field

The present disclosure relates to a metal glycerate in the electrochemical field and an electrocatalyst thereof, and particularly to a composite metal glycerate with high activity for oxygen evolution reaction and an electrocatalyst thereof.

2. Description of Relevant Art

Oxygen evolution reaction (OER) can generate energy through electrochemical water-splitting and plays an important role in energy storage devices, such as rechargeable metal air batteries. However, OER suffers from its sluggish reaction kinetics, and solving the issues related to the sluggish reaction kinetics is not trivial. One of the solutions is to reduce the overpotential to accelerate the kinetics of OER. Up to date, ruthenium oxide ($RuO_2$) and iridium oxide ($IrO_2$) are the most active electrocatalyst for OER. Nevertheless, ruthenium and iridium are precious metals, and the high prices and scarcity prevent their large-scale industrial applications.

Presently, the search for metal materials as alternative OER electrocatalysts has been called for. It has been reported that the first-row transition metal hydroxides can be used as efficient materials for enhancing the activity of OER under alkaline media. For example, the hydroxides of double metals, such as NiFe and CoFe, have been reported to be highly active OER electrocatalysts and exhibit very low overpotential. Moreover, introducing a third kind of metals (e.g., V, Cr or Mo) can further improve the activity of OER. In view of the foregoing, the catalytic activity or performance strongly depends on the components and the surface electronic structure of the catalysts. In order to improve the catalytic performance, the complexity of the constituents of the catalysts would be increased.

Accordingly, there is still an unmet need for providing a metal material having the high activity of OER.

SUMMARY

The present disclosure provides a high-entropy composite glycerate and an electrocatalyst thereof, which possesses the quinary-metal glycerate structure and thus exhibits much excellent activity of OER than binary-metal glycerates, ternary-metal glycerates, or quaternary-metal glycerates. Therefore, the high-entropy composite glycerate provided herein is suitable for being used as an electrocatalyst for electrolyzing water. That is to say, the synergistic effect resulting from the multiple metals within the glycerate structure is significant, and allows additional freedom to manipulate the electronic structure and the coordination environment. Accordingly, the high-entropy composite glycerate of the present disclosure can exhibit high activity of OER without the presence of precious metals, and therefore is suitable for being used as an electrocatalyst for electrolyzing water.

The high-entropy composite glycerate of the present disclosure is represented by Formula (I) below:

$$NiCrFeCoMn(C_3H_5O_4)_n \qquad (I),$$

wherein n is a positive integer from 1 to 3, and wherein each of the Ni, Cr, Fe, Co, and Mn has an atom percent between 5 and 35 based on the total amount of the Ni, Cr, Fe, Co, and Mn.

In at least one embodiment of the present disclosure, metal glycerates formed from each of the Ni, Cr, Fe, Co, and Mn of the high-entropy composite glycerate in combination with the glycerate anion have layered structures.

In at least one embodiment of the present disclosure, the layered structures of the high-entropy composite glycerate are stacked upon each other, and allow the high-entropy composite glycerate to have a particle structure.

In at least one embodiment of the present disclosure, each of the Ni, Cr, Fe, Co, and Mn is homogenously distributed within the high-entropy composite glycerate.

Also, the present disclosure provides a method for preparing the above high-entropy composite glycerate, comprising: performing a solvothermal reaction of a reaction solution, wherein the reaction solution comprises a precursor dissolved therein and glycerol, and the precursor comprises a $Ni^{2+}$ metal salt, a $Co^{2+}$ metal salt, a $Cr^{3+}$ metal salt, a $Mn^{2+}$ metal salt, and a $Fe^{3+}$ metal salt; and separating the high-entropy composite glycerate from the reaction solution after the solvothermal reaction.

In at least one embodiment of the method of the present disclosure, the reaction solution is prepared by dissolving the precursor in isopropanol, and adding the glycerol into the isopropanol dissolved with the precursor.

In at least one embodiment of the method of the present disclosure, a weight ratio of the glycerol to the isopropanol is from 1:2 to 1:5.

In at least one embodiment of the method of the present disclosure, the solvothermal reaction is performed at a temperature of 140° C. to 200° C.

In at least one embodiment of the method of the present disclosure, the solvothermal reaction is performed for 6 to 16 hours.

In at least one embodiment of the method of the present disclosure, a metal salt of each of the $Ni^{2+}$ metal salt, the $Co^{2+}$ metal salt, the $Cr^{3+}$ metal salt, the $Mn^{2+}$ metal salt, and the $Fe^{3+}$ metal salt is independently selected from the group consisting of a metal nitrate, a metal halide, a metal acetate, and a metal sulfate, and the metal salts in the reaction solution have the same mole number.

In at least one embodiment of the method of the present disclosure, a molar ratio of the precursor to the glycerol is from 1:10 to 1:20.

In at least one embodiment of the method of the present disclosure, a molar ratio of each of the $Ni^{2+}$ metal salt, the $Co^{2+}$ metal salt, the $Cr^{3+}$ metal salt, the $Mn^{2+}$ metal salt, and the $Fe^{3+}$ metal salt to the glycerol is from 0.01 to 1.

The present disclosure further provides an electrocatalyst for electrolyzing water, comprising the above high-entropy composite glycerate of the present disclosure.

The high-entropy composite glycerate according to the above embodiments of the present disclosure has high-entropy stabilization effect, and therefore has an excellent electrochemical performance of oxygen evolution reaction. The high-entropy composite glycerate is electrochemically stable during oxygen evolution reaction and has an excellent cycling stability and long-term durability. Therefore, the high-entropy composite glycerate provided in the present disclosure is suitable for being used as an electrocatalyst for electrolyzing water.

The present disclosure further provides a use of the high-entropy composite glycerate in a high-entropy composite glycerate electrolytic cell, which achieves a good performance of overall water-splitting. Moreover, in addition to an excellent activity and a low overpotential of oxygen evolution reaction (OER), the high-entropy composite glycerate also has an excellent activity and a low overpotential of hydrogen evolution reaction (HER).

It thus can be seen that each of the metals may be homogenously distributed within the high-entropy composite glycerate due to the synergistic effect resulting from the quinary-metal glycerate structure of the high-entropy composite glycerate of the present disclosure, and the synergistic effect may reduce the overpotential of OER. Accordingly, the high-entropy composite glycerate of the present disclosure is suitable for catalyzing OER and has the prospect for application.

BRIEF DESCRIPTION OF THE DRAWINGS

The present disclosure can be more understood by reading the following descriptions of the embodiments, with reference made to one or more of the accompanying drawings below.

DETAILED DESCRIPTION

Figure 1A:
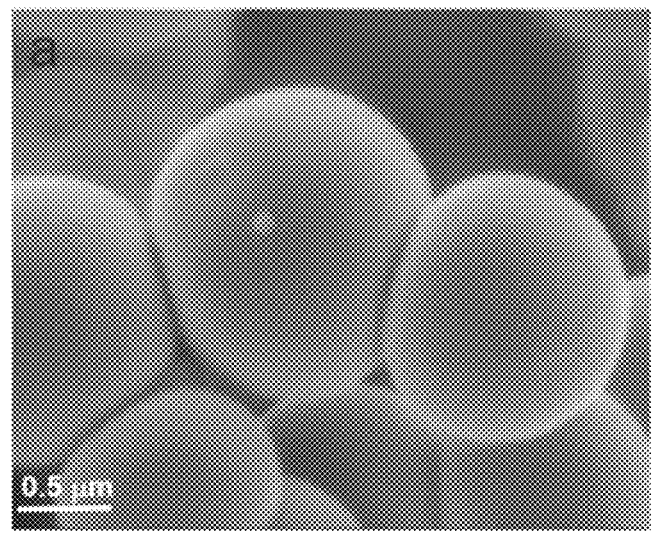
FIG. 1A illustrates the surface morphology of the high-entropy composite glycerate of an embodiment of the present disclosure examined by scanning electron microscopy (SEM).

In the following descriptions of the embodiments of the present disclosure, reference is made to the accompanying drawings, which are shown to illustrate the embodiments in which the present disclosure may be practiced. These embodiments are provided to enable those skilled in the art to practice the present disclosure. It is understood that other embodiments may be used and that changes can be made to the embodiments without departing from the scope of the present disclosure. The following descriptions are therefore not to be considered as limiting the scope of the present disclosure.

It should also be understood that, unless clearly indicated to the contrary, in any methods claimed herein that include more than one step or act, the order of the steps or acts of the method is not necessarily limited to the order in which the steps or acts of the method are recited.

Titles or subtitles may be used in this disclosure for the convenience of a reader, which shall have no influence on the scope of the present disclosure.

Unless otherwise defined herein, scientific and technical terminologies employed in the present disclosure have the meanings that are commonly understood and used by one of ordinary skill in the art. All definitions, as defined and used herein, should be understood to control over dictionary definitions, definitions in documents incorporated by reference, and/or ordinary meanings of the defined terms.

As used herein, the phrase "at least one," in reference to a list of one or more elements, should be understood to mean at least one element selected from any one or more of the elements in the list of elements, but not necessarily including at least one of each and every element listed within the list of elements and not excluding any combinations of elements in the list of elements. This definition also allows that elements may optionally be present other than the elements identified within the list of elements to which the phrase "at least one" refers, whether related or unrelated to those elements identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The present disclosure provides a high-entropy composite glycerate, which is represented by Formula (I) below:

$$NiCrFeCoMn(C_3H_5O_4)_n \qquad (I),$$

wherein n is a positive integer from 1 to 3, such as 1, 2, and 3. In some embodiments of the present disclosure, each of the Ni, Cr, Fe, Co, and Mn has an atom percent between 5 and 35, such as 5, 10, 15, 16, 19, 20, 22, 23, 25, 30, and 35, based on the total amount of the Ni, Cr, Fe, Co, and Mn.

For example, each of the Ni, Cr, Fe, Co, and Mn of the high-entropy composite glycerate is combined with a glycerate anion to form a metal glycerate. In some embodiments of the present disclosure, the metal glycerates formed from each of the Ni, Cr, Fe, Co, and Mn with the glycerate anions are represented by chemical formulae of $(NiC_6H_{12}O_8)$, $(CrC_9H_{18}O_{12})$, $(FeC_9H_{18}O_{12})$, $(CoC_6H_{12}O_8)$, and $(MnC_6H_{12}O_8)$, respectively.

In at least one embodiment of the present disclosure, the high-entropy composite glycerate comprises quinary-metal of Ni, Cr, Fe, Co, and Mn. Each of Ni, Cr, Fe, Co, and Mn with a glycerate anion forms a layered structure. That is to say, $(NiC_6H_{12}O_8)$, $(CrC_9H_{18}O_{12})$, $(FeC_9H_{18}O_{12})$, $(CoC_6H_{12}O_8)$, and $(MnC_6H_{12}O_8)$ formed from each of the metals with the glycerate anions are layered structures. For example, the metal glycerate may have a layered structure that is composed of stacked metal-oxygen sheets separated by glycerate anions. The layered structure is similar to anion-intercalated hydroxides, which provides interlayer spacing for the accommodation of reactants, and therefore, the open layered structure allows rapid transport of the reactants to the material and also gives increased catalytic active sites. Accordingly, the high-entropy composite glycerate of the present disclosure is composed of multiple elements, has high-entropy stabilization effect, and thus has an excellent performance of electrochemical OER.

In at least one embodiment of the present disclosure, the layered structures of the high-entropy composite glycerate are stacked upon each other, and allow the high-entropy composite glycerate to form a particle structure. In at least one embodiment of the present disclosure, the high-entropy composite glycerate particles can be prepared to have various particle sizes according to actual demand. In addition, the high-entropy composite glycerate particles having various particle sizes may exhibit good homogeneity.

In at least one embodiment of the present disclosure, each of the Ni, Cr, Fe, Co, and Mn of the high-entropy glycerate is homogenously distributed within the high-entropy composite glycerate.

The present disclosure further provides a method for preparing the aforementioned high-entropy composite glycerate, comprising preparing a reaction solution, performing a solvothermal reaction of the reaction solution, and separating the high-entropy composite glycerate from the reaction solution after the solvothermal reaction.

In at least one embodiment of the present disclosure, the reaction solution comprises a precursor dissolved therein and glycerol, and the precursor comprises a $Ni^{2+}$ metal salt, a $Co^{2+}$ metal salt, a $Cr^{3+}$ metal salt, a $Mn^{2+}$ metal salt, and a $Fe^{3+}$ metal salt.

In at least one embodiment of the present disclosure, the preparation of the reaction solution comprises dissolving the precursor in the isopropanol first, and adding glycerol into the isopropanol dissolved with the precursor.

In at least one embodiment of the present disclosure, the glycerol to the isopropanol has a weight ratio from 1:2 to 1:5, such as 1:2, 1:3, 1:3.5, 1:4, and 1:5. In some embodiments of the present disclosure, the weight ratio of the glycerol to the isopropanol is 1:3.49.

In at least one embodiment of the present disclosure, the preparation of the reaction solution further comprises stirring the reaction solution to completely dissolve the precursor therein, thereby forming a homogeneous phase.

The term "solvothermal reaction" as used herein refers to a method for preparing a martial, in which precursors in a reaction solution is subjected to react with a solvent other than water under a given temperature and a pressure produced by the reaction solution in a hermetic container. In at least one embodiment of the present disclosure, the solvothermal reaction of the reaction solution is performed at a temperature of 140° C. to 200° C. For example, the solvothermal reaction for the reaction solution is performed at, but not limited to, a temperature of 140° C., 150° C., 160° C., 170° C., 180° C., 190° C., and 200° C. In some embodiments of the present disclosure, the solvothermal reaction of the reaction solution is performed for a time period of 6 to 16 hours. For example, the solvothermal reaction for the reaction solution is performed for, but not limited to, a time period of 6, 7, 8, 9, 10, 11, 12, 13, 14, 15, and 16 hours. In yet embodiment of the present disclosure, the solvothermal reaction of the reaction solution is performed at a temperature of 150° C. for 10 hours.

In at least one embodiment of the present disclosure, the metal salts are selected from the group consisting of metal nitrates, metal halides, metal acetates, and metal sulfates, and the metal salts are present in the reaction solution in the same mole number.

In at least one embodiment of the present disclosure, a molar ratio of the precursor to the glycerol is from 1:10 to 1:20, such as 1:10, 1:11, 1:12, 1:13, 1:14, 1:15, 1:16, 1:17, 1:18, 1:19, and 1:20, but is not limited thereto.

In at least one embodiment of the present disclosure, a molar ratio of each of the $Ni^{2+}$ metal salt, the $Co^{2+}$ metal salt, the $Cr^{3+}$ metal salt, the $Mn^{2+}$ metal salt, and the $Fe^{3+}$ metal salt to the glycerol is from 0.01 to 1, such as 0.01, 0.02, 0.03, 0.04, 0.05, 0.06, 0.07, 0.08, 0.082, 0.09, 0.10, 0.20, 0.30, 0.40, 0.50, 0.60, 0.70, 0.80, 0.90, and 1.00, but is not limited thereto.

Additionally, the present disclosure also provides an electrocatalyst for electrolyzing water, comprising the high-entropy composite glycerate of at least one embodiment of the present disclosure. In other words, the present disclosure provides a use of the aforementioned high-entropy composite glycerate as a catalyst in electrolyzing water, or in catalyzing the electrolyzation of water. For example, the present disclosure provides a use of the aforementioned high-entropy composite glycerate in catalyzing OER and/or HER.

Without further elaboration, it is believed that one skilled in the art can utilize the present disclosure to its fullest extent. The following embodiments are, therefore, to be construed as merely illustrative, and not limitative of the remainder of the disclosure in any way whatsoever.

PREPARATION EXAMPLE 1

Preparation of the High-Entropy Composite Glycerate

Firstly, a precursor was dissolved in 34 mL of isopropanol (Macron, a purity of 99.5%) under continuously stirring, and the precursor included cobalt(II) nitrate hexahydrate (Co($NO_3$)$_2$·6$H_2O$, J.T. Baker, a purity of 99%), chromium (III) nitrate nonahydrate (Cr($NO_3$)$_3$·9$H_2O$, Alfa Aesar, a purity of 98.5%), iron (III) nitrate nonahydrate (Fe($NO_3$)$_3$·9$H_2O$, J.T. Baker, a purity of 99%), manganese (II) nitrate hexahydrate (Mn($NO_3$)$_2$·6$H_2O$, Alfa Aesar, a purity of 98.5%), and nickel (II) nitrate hexahydrate (Ni($NO_3$)$_2$·6$H_2O$, Alfa Aesar, a purity of 98.5%). Each of the cobalt (II) nitrate hexahydrate, the chromium (III) nitrate nonahydrate, the iron (III) nitrate nonahydrate, the manganese (II) nitrate hexahydrate, and nickel (II) nitrate hexahydrate had a mole number of 0.5 mmole. Subsequently, 6 mL of glycerol (Macron, a purity of 99.5%) was added into the isopropanol dissolved with the precursor, and a reaction solution with a homogeneous phase was generated by continuously stirring the isopropanol added with the glycerol. The color of the reaction solution was dark brown.

Next, the reaction solution was transferred to a 100 mL Teflon-lined stainless-steel autoclave, and heated at a temperature of 150° C. for 10 hours to perform a solvothermal reaction. After the solvothermal reaction, the autoclave was placed at a room temperature for cooling down to the room temperature naturally. Further, the precipitate was separated from the reaction solution through centrifugation, washed with absolute ethanol for several times, and dried at 60° C. for 24 hours in a vacuum oven, so as to obtain the high-entropy composite glycerate, which was referred as FeNiCoCrMn-G herein.

COMPARATIVE PREPARATION EXAMPLE 2

Preparation of a Binary-Metal Glycerate

The preparation of the binary-metal glycerate was the same as the process described in preparation example 1, except that the precursor included Fe($NO_3$)$_3$·9$H_2O$ and Ni($NO_3$)$_2$·6$H_2O$, and each of Fe($NO_3$)$_3$·9$H_2O$ and Ni($NO_3$)$_2$·6$H_2O$ had a mole number of 0.5 mmole. The obtained product was FeNi-binary-metal glycerate, which was referred as FeNi-G herein.

COMPARATIVE PREPARATION EXAMPLE 3

Preparation of a Ternary-Metal Glycerate

The preparation of the ternary-metal glycerate was the same as the process described in preparation example 1, except that the precursor included Fe($NO_3$)$_3$·9$H_2O$, Ni($NO_3$)$_2$·6$H_2O$, and Co($NO_3$)$_2$·6$H_2O$, and each of Fe($NO_3$)$_3$·9$H_2O$, Ni($NO_3$)$_2$·6$H_2O$, and Co($NO_3$)$_2$·6$H_2O$ had a mole number of 0.5 mmole. The obtained product was FeNiCo-ternary-metal glycerate, which was referred as FeNiCo-G herein.

COMPARATIVE PREPARATION EXAMPLE 4

Preparation of Quaternary-Metal Glycerate

The preparation of the quaternary-metal glycerate was the same as the process described in preparation example 1, except that the precursor included Fe($NO_3$)$_3$·9$H_2O$, Ni($NO_3$)$_2$·6$H_2O$, Co($NO_3$)$_2$·6$H_2O$, and Mn($NO_3$)$_2$·6$H_2O$, and each of Fe($NO_3$)$_3$·9$H_2O$, Ni($NO_3$)$_2$·6$H_2O$, Co($NO_3$)$_2$·6$H_2O$ and Mn($NO_3$)$_2$·6$H_2O$ had a mole number of 0.5 mmole. The obtained product was FeNiCoMn-quaternary-metal glycerate, which was referred as FeNiCoMn-G herein.

COMPARATIVE PREPARATION EXAMPLE 5

Preparation of Quaternary-Metal Glycerate

The preparation of the quaternary-metal glycerate was the same as the process described in preparation example 1, except that the precursor included Fe($NO_3$)$_3$·9$H_2O$, Ni($NO_3$)$_2$·6$H_2O$, Co($NO_3$)$_2$·6$H_2O$, and Cr($NO_3$)$_3$·9$H_2O$, and each of Fe($NO_3$)$_3$·9$H_2O$, Ni($NO_3$)$_2$·6$H_2O$, Co($NO_3$)$_2$·6$H_2O$, and Cr($NO_3$)$_3$·9$H_2O$ had a mole number of 0.5 mmole. The obtained product was FeNiCoCr-quaternary-metal glycerate, which was referred as FeNiCoCr-G herein.

COMPARATIVE PREPARATION EXAMPLE 6

Preparation of Quaternary-Metal Glycerate

The preparation of the quaternary-metal glycerate was the same as the process described in preparation example 1, except that the precursor included Fe($NO_3$)$_3$·9$H_2O$, Ni($NO_3$)$_2$·6$H_2O$, Cr($NO_3$)$_3$·9$H_2O$, and Mn($NO_3$)$_2$·6$H_2O$, and each of Fe($NO_3$)$_3$·9$H_2O$, Ni($NO_3$)$_2$·6$H_2O$, Cr($NO_3$)$_3$·9$H_2O$, and Mn($NO_3$)$_2$·6$H_2O$ had a mole number of 0.5 mmole. The obtained product was FeNiCrMn-quaternary-metal glycerate, which was referred as FeNiCrMn-G herein.

COMPARATIVE PREPARATION EXAMPLE 7

Preparation of Quaternary-Metal Glycerate

The preparation of the quaternary-metal glycerate was the same as the process described in preparation example 1, except that the precursor included Fe($NO_3$)$_3$·9$H_2O$, Co($NO_3$)$_2$·6$H_2O$, Cr($NO_3$)$_3$·9$H_2O$, and Mn($NO_3$)$_2$·6$H_2O$, and each of Fe($NO_3$)$_3$·9$H_2O$, Co($NO_3$)$_2$·6$H_2O$, Cr($NO_3$)$_3$·9$H_2O$, and Mn($NO_3$)$_2$·6$H_2O$ had a mole number of 0.5 mmole. The obtained product was FeCoCrMn-quaternary-metal glycerate, which was referred as FeCoCrMn-G herein.

COMPARATIVE PREPARATION EXAMPLE 8

Preparation of Quaternary-Metal Glycerate

The preparation of the quaternary-metal glycerate was the same as the process described in preparation example 1, except that the precursor included Ni($NO_3$)$_2$·6$H_2O$, Co($NO_3$)$_2$·6$H_2O$, Cr($NO_3$)$_3$·9$H_2O$, and Mn($NO_3$)$_2$·6$H_2O$, and each of Ni($NO_3$)$_2$·6$H_2O$, Co($NO_3$)$_2$·6$H_2O$, Cr($NO_3$)$_3$·9$H_2O$, and Mn($NO_3$)$_2$·6$H_2O$ had a mole number of 0.5 mmole. The obtained product was NiCoCrMn-quaternary-metal glycerate, which was referred as NiCoCrMn-G herein.

The high-entropy composite glycerate prepared from preparation example 1 and the metal glycerates prepared from comparative preparation examples 2-8 were analyzed as follows.

(1) Analysis of the Element Concentrations

The chemical compositions of the high-entropy composite glycerate and the binary-metal glycerates, ternary-metal glycerates and quanternary-metal glycerates were analyzed by inductively coupled plasma-mass spectrometry (ICP-MS, Thermo-Element XR), and the results were shown in Table 1.

TABLE 1

The concentrations of the metal elements in preparation example 1 and comparative preparation examples 2-8

| Sample ID | Fe (atom %) | Ni (atom %) | Co (atom %) | Cr (atom %) | Mn (atom %) |
|---|---|---|---|---|---|
| Preparation example 1 | 22.0 | 19.4 | 19.1 | 23.0 | 16.5 |
| Comparative preparation example 2 | 51.3 | 48.7 | 0 | 0 | 0 |
| Comparative preparation example 3 | 34.5 | 32.9 | 32.6 | 0 | 0 |
| Comparative preparation example 4 | 27.1 | 25.6 | 26.0 | 0 | 21.3 |
| Comparative preparation example 5 | 25.7 | 23.9 | 23.5 | 26.9 | 0 |
| Comparative preparation example 6 | 26.8 | 24 | 0 | 28.6 | 20.6 |
| Comparative preparation example 7 | 26.9 | 0 | 24.4 | 28.2 | 20.5 |
| Comparative preparation example 8 | 0 | 26.1 | 25.2 | 28.4 | 20.3 |

As shown in Table 1, the concentrations of each metal element were approximately equivalent to the ratio of the added precursors in preparation example 1 and comparative preparation examples 2-8.

(2) Surface Morphology

Figure 1B:
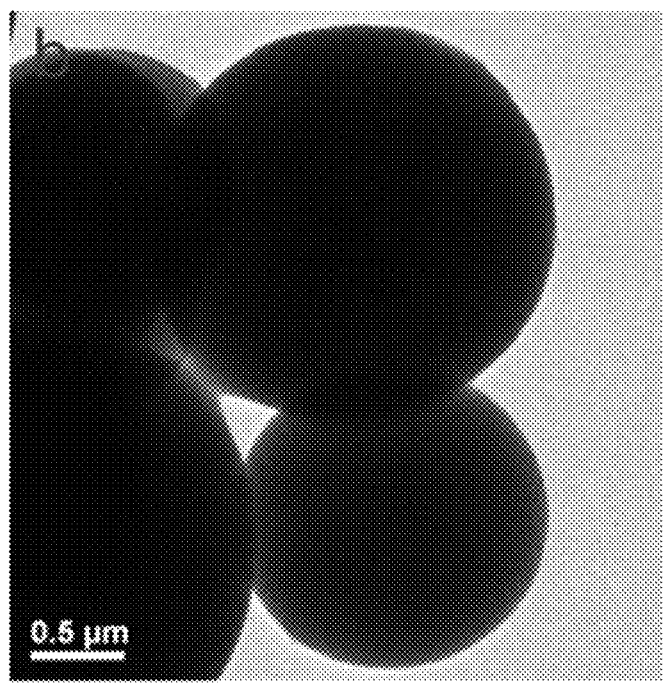
FIG. 1B illustrates the surface morphology of the high-entropy composite glycerate of an embodiment of the present disclosure examined by transmission electron microscopy (TEM).

As shown in FIGS. 1A and 1B, the morphology of the high-entropy composite glycerate of preparation example 1 was examined by scanning electron microscopy (SEM, JEOL 6701F) and transmission electron microscopy (TEM, JEOL 2100F). It thus can be seen that the high-entropy composite glycerates of the present disclosure were microspheres with uniform sizes.

(3) Element Distribution

Figure 2:
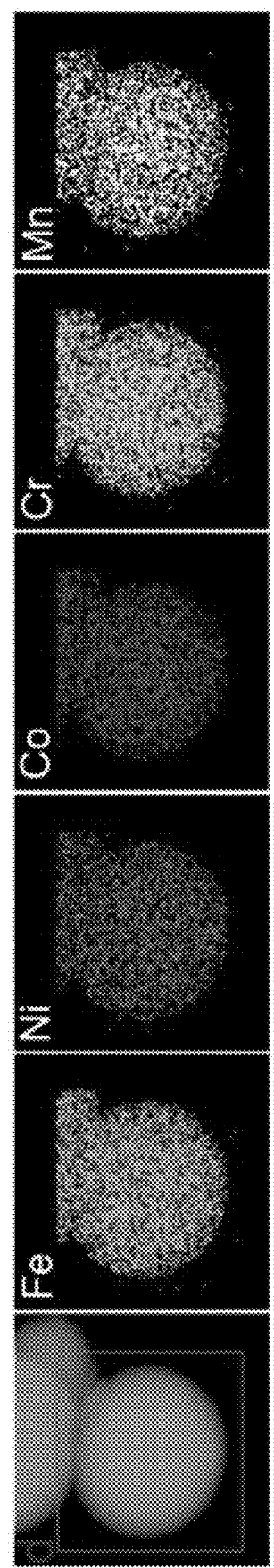
FIG. 2 illustrates the element mappings of the high-entropy composite glycerate of an embodiment of the present disclosure examined by dark field scanning transmission electron microscopy (STEM) in combination with energy-dispersive X-ray spectroscopy (EDS).

As shown in FIG. 2, the high-entropy composite glycerate of preparation example 1 was analyzed by dark field scanning transmission electron microscopy (STEM) in combination with energy-dispersive X-ray spectroscopy (EDS). In FIG. 2, it can be seen that each of the metal elements was homogenously distributed in the high-entropy composite glycerate microspheres of the present disclosure.

(4) Analysis of Crystalline Structure

Figure 3A:
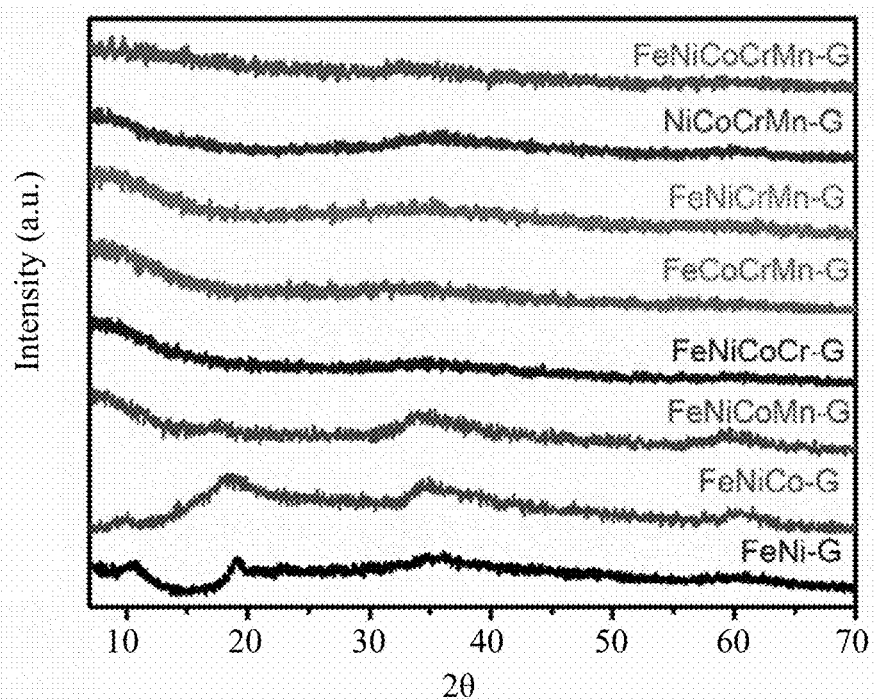
FIG. 3A illustrates the X-ray diffraction (XRD) patterns of the high-entropy composite glycerate of an embodiment of the present disclosure and the metal glycerates of comparative preparation examples.
Figure 3B:
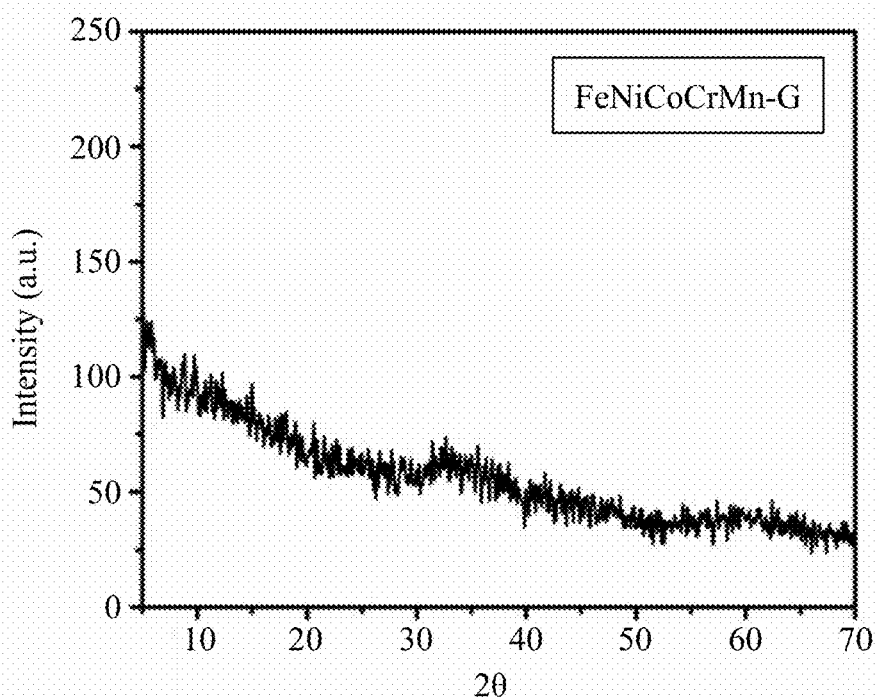
FIG. 3B illustrates the XRD pattern of the high-entropy composite glycerate of an embodiment of the present disclosure.

The crystalline structures of the samples from preparation example 1 and comparative preparation examples 2-8 were analyzed by X-ray diffractometry (XRD, Rigaku) with a Cu Kα radiation source having a wavelength of 1.5418 Å, and the scanning angle was from 10° to 80° with a scanning rate of 2°/min. The analysis results were shown in FIGS. 3A and 3B. For example, FeNi-G showed diffraction peaks at 10.8°, 19.2°, 35.3°, and 60°, indicating that the metal glycerates are composed of stacked metal-oxygen sheets separated by bonded glycerate ions. As shown in FIG. 3A, by adding more elements, the diffraction peaks became broader. It is suggested that the metal glycerate including more metal elements would have a lower crystallinity.

(5) Analysis of Oxidation State

Figure 4A:
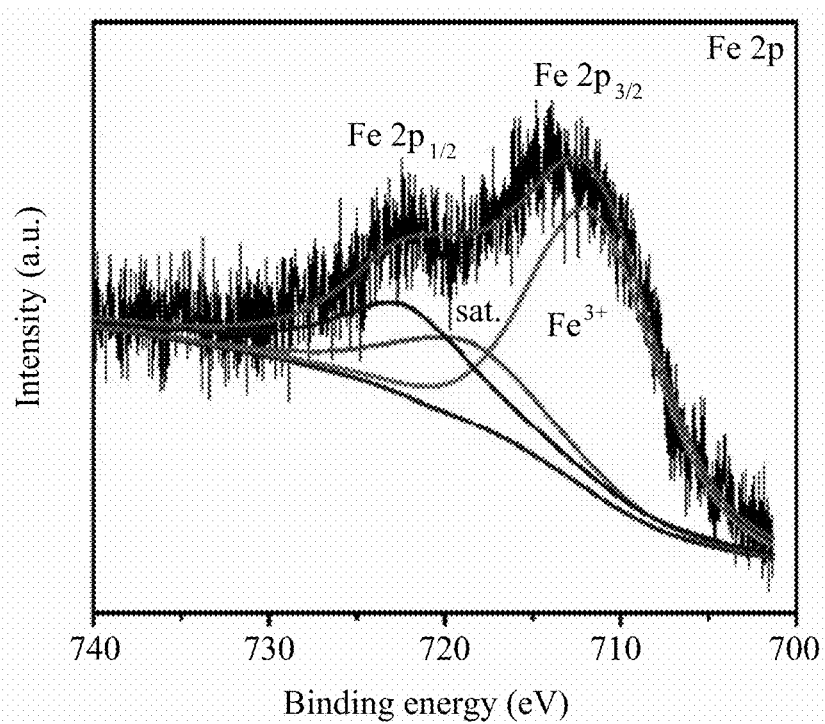
FIGS. 4A to 4G illustrate the spectrograms of X-ray photoelectron spectroscopy (XPS) of the high-entropy composite glycerate of an embodiment of the present disclosure.
Figure 4B:
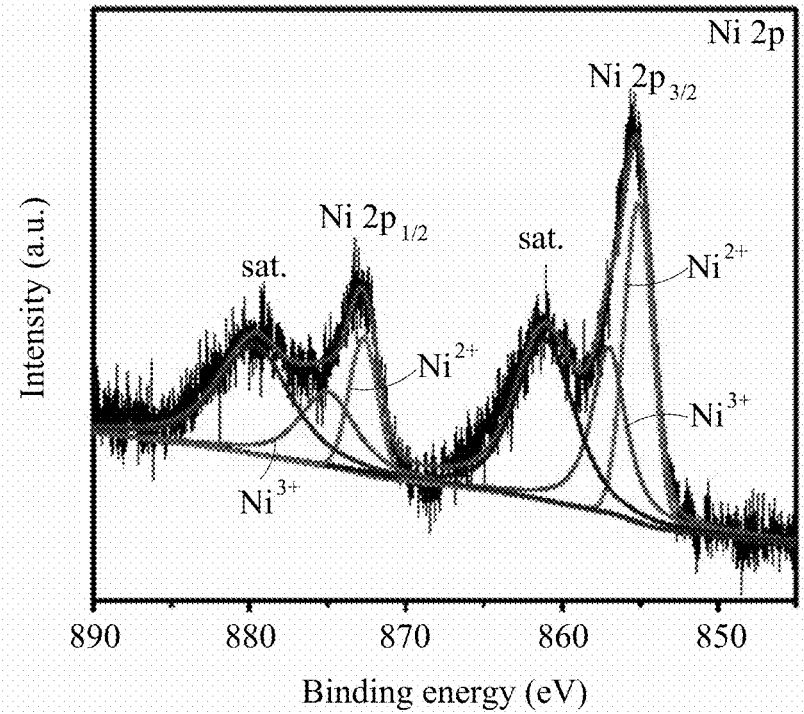
Figure 4C:
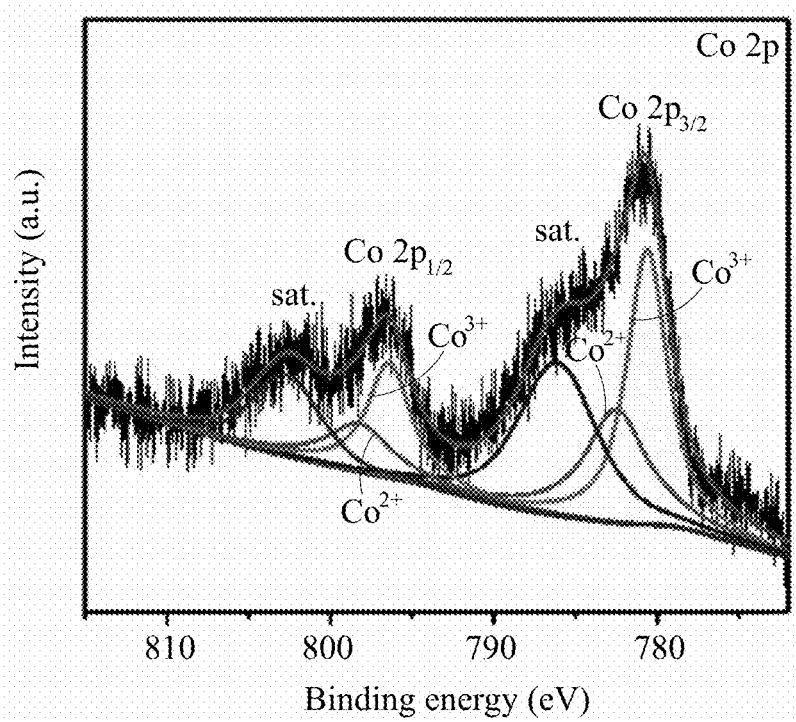
Figure 4D:
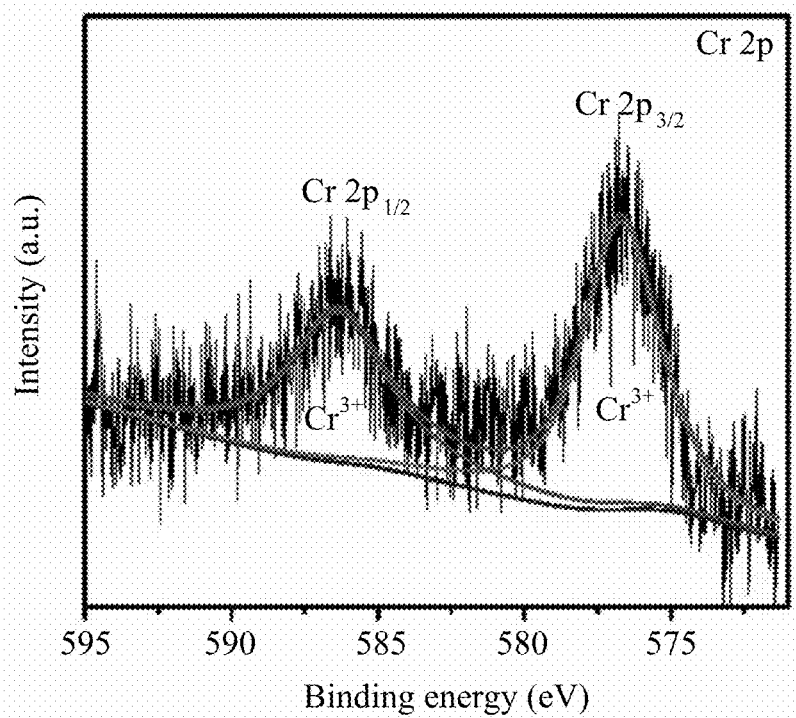
Figure 4E:
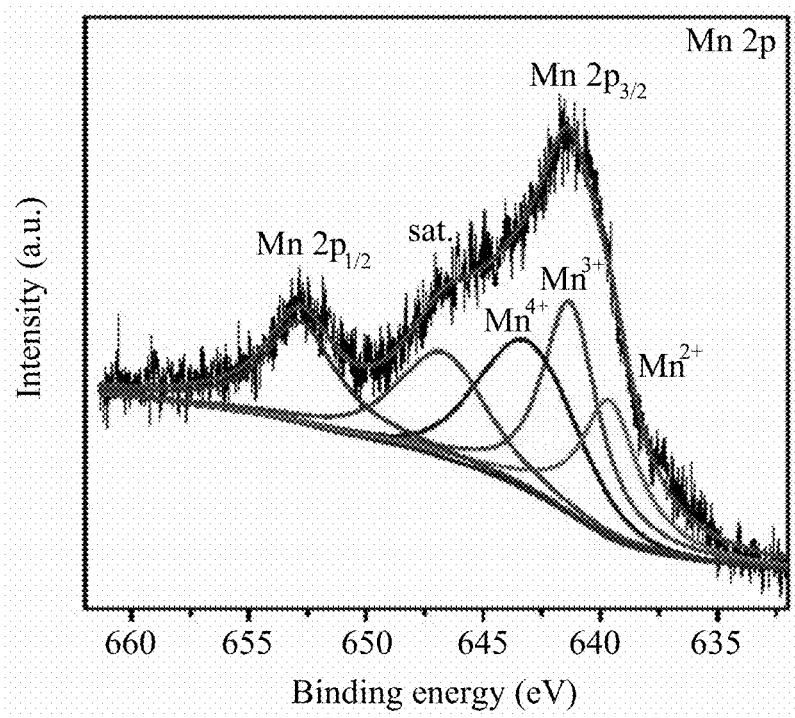
Figure 4F:
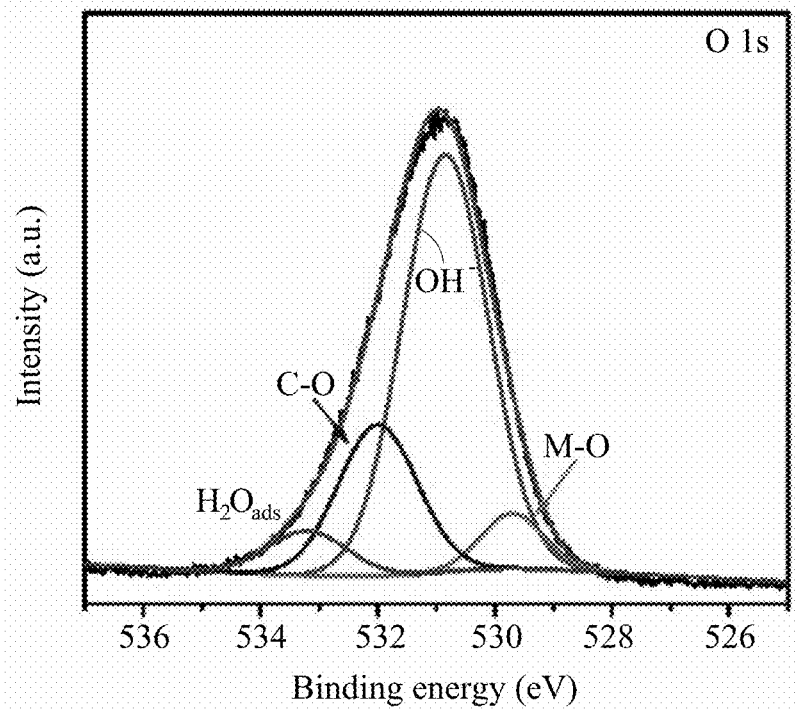
Figure 4G:
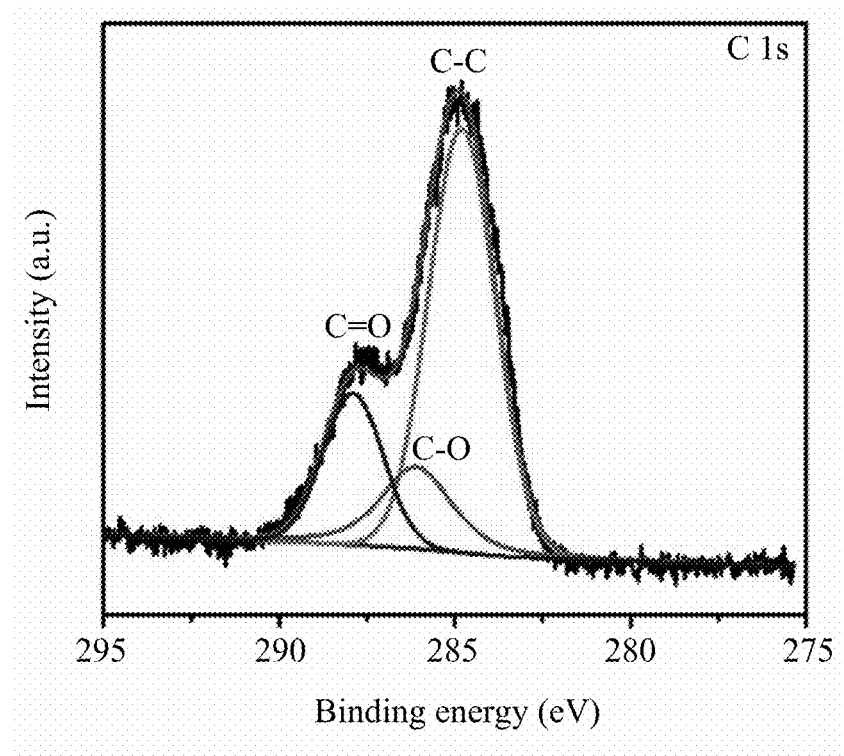

As shown in FIGS. 4A to 4G, the oxidation state of each metal element of the high-entropy composite glycerate of preparation example 1 was analyzed by X-ray photoelectron spectroscopy (XPS, Versaprobe PHI 5000). The Fe 2p spectrum of FIG. 4A showed broadened Fe $2p_{3/2}$ and Fe $2p_{1/2}$ peaks, belonging to $Fe^{3+}$, center at 712.4 eV and 723.6 eV, respectively. A satellite peak of $Fe^{3+}$ was located at 718.4 eV. In the Ni 2p spectrum as shown in FIG. 4B, the Ni $2p_{3/2}$ $Ni^{2+}$ and Ni $2p_{1/2}$ $Ni^{2+}$ peaks were located at 855.2 eV and 872.9 eV, respectively, and the Ni $2p_{3/2}$ $Ni^{3+}$ and Ni $2p_{1/2}$ $Ni^{3+}$ peaks were located at 857.2 eV and 875.3 eV, respectively. Two prominent shake-up satellite peaks at 861.4 eV and 880.0 eV were observed. That is to say, the high-entropy composite glycerate of the present disclosure has two oxidation states of $Ni^{2+}$ and $Ni^{3+}$. Two oxidation states of $Co^{3+}$ and $Co^{2+}$ can be seen in the Co 2p spectrum of FIG. 4C. The peaks at 780.6 eV and 796.4 eV corresponded to Co $2p_{3/2}$ $Co^{3+}$ and Co $2p_{1/2}$ $Co^{3+}$, respectively. The peaks at 782.3 eV and 798.2 eV belonged to Co $2p_{3/2}$ $Co^{2+}$ and Co $2p_{1/2}$ $Co^{2+}$, respectively. Two prominent shake-up satellite peaks can be found at 786.1 eV and 802.6 eV. In the Cr 2p spectrum as shown in FIG. 4D, the peaks of Cr $2p_{3/2}$ $Cr^{3+}$ and Cr $2p_{1/2}$ $Cr^{3+}$ were located at 576.5 eV and 586.3 eV, respectively. In the Mn 2p spectrum of FIG. 4E, the peaks at 641.3 eV and 653.2 eV belonged to Mn $2p_{3/2}$ and Mn $2p_{1/2}$, respectively. The Mn $2p_{3/2}$ peak can be deconvoluted into three peaks, which were $Mn^{2+}$ at 640 eV, $Mn^{3+}$ at 641.35 eV, and $Mn^{4+}$ at 643 eV, respectively, and the peak at 647 eV was a satellite peak. In addition, the O 1s spectrum in FIG. 4F were deconvoluted into four components, which were assigned to the lattice oxygen O-M bonding at 529.6 eV, O—H bonding at 531.3 eV, C—O bonding at 532 eV, and physically absorbed water at 533.2 eV, respectively. For the C 1s spectrum as shown in FIG. 4G, the peaks at 284.8 eV, 286.2 eV, and 287.6 eV were attributed to the C—C bonding, C—O bonding, and C=O bonding, respectively.

(6) Molecular Structure

Figure 5:
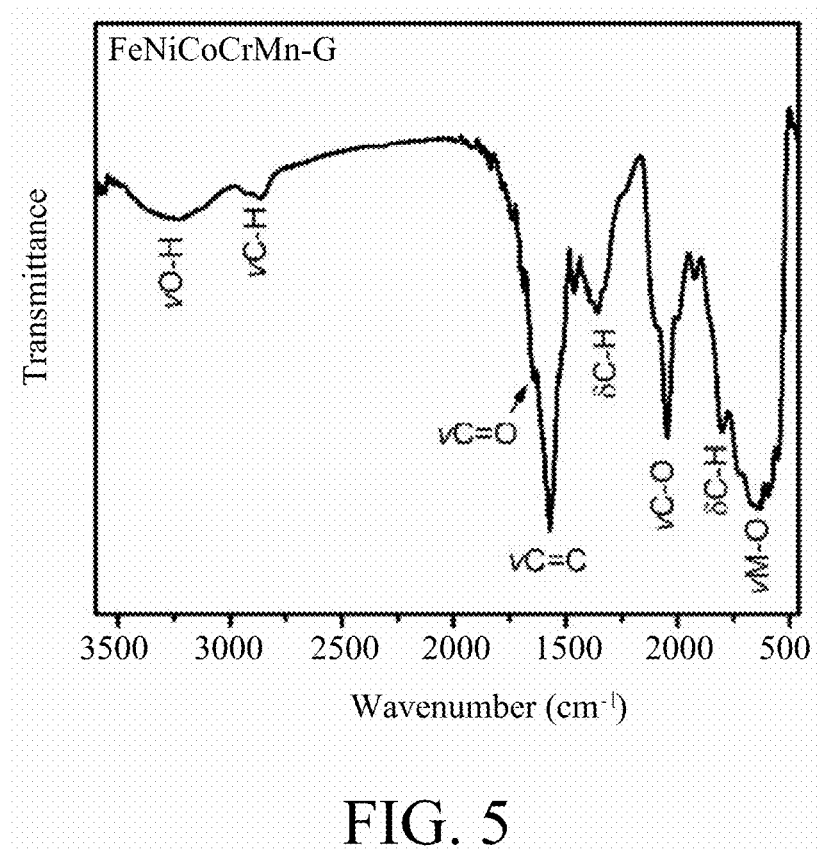
FIG. 5 illustrates the spectrogram of Fourier transform infrared spectrometer (FTIR) of the high-entropy composite glycerate of an embodiment of the present disclosure.

As shown in FIG. 5, the molecular structure of the high-entropy composite glycerate in preparation example 1 was analyzed by Fourier transform infrared spectrometer (FTIR, PerkinElmer Frontier). It was observed in FIG. 5 that the high-entropy composite glycerate had a glycerol moiety. For example, in the absorption spectrum of the high-entropy composite glycerate of the present disclosure, the broad IR absorption band centered at 3,400 $cm^{-1}$ was attributed to the stretching vibrations of hydrogen bonded O—H groups; the absorption bands between 2,850 and 2,950 $cm^{-1}$ were assigned to the C—H stretching vibrations; the high-intensity band at 1,580 $cm^{-1}$ corresponded to the C=C stretching vibrations; the peak at 1,640 $cm^{-1}$ was attributed to the vibrations of C=O bonding; the absorption band at 1,358 $cm^{-1}$ was indexed to the C—H bending vibrations; the band at 1,100 $cm^{-1}$ was attributed to the C—O stretching vibrations; and the peak at about 800 $cm^{-1}$ was assigned to the out-of-plane C—H bending vibrations. Further, the prominent IR band centering at 630 $cm^{-1}$ was associated with metal-oxygen (M-O; M refers to Fe, Ni, Co, Cr, or Mn) stretching vibrations. In view of the foregoing, as shown in the molecular structure of FIG. 5, the high-entropy composite glycerate prepared in preparation example 1 indeed formed the structure of multi-metal glycerate.

For evaluating the activity of the high-entropy composite glycerate in electrolyzing oxygen evolution reaction, working electrodes were prepared as follows. For example, the high-entropy composite glycerate of preparation example 1 and the metal glycerates of comparative preparation examples 2-8 were used as catalyst powder.

Preparation of Working Electrode 5 mg of the catalyst powders and 40 μL of a 5 wt % perfluorosulfonic acid (PFSA) polymer solution (Nafion, DuPont, a purity of 5%) were dispersed in a mixture of water (350 μL) and alcohol (150 μL), and the mixture dispersed with catalyst powders and Nafion was conducted under ultrasonication for at least 1 hour to form a homogeneous catalyst slurry. Next, the catalyst slurry was drop-casted onto a Ni foam substrate to cover an area of 1 cm×1 cm, and was dried in a vacuum oven at 60° C. for 1 hour. The working electrode was obtained, and the active mass loading thereof was about 2.5 mg/cm². Before being used, the working electrode was washed with a HCL solution having a molarity of 3 M for 10 minutes, and then sonicated in de-ionized water, acetone, and ethanol subsequently for several times to remove the surface oxides from the electrode.

The electrochemical measurements were performed at room temperature through an Autolab electrochemical workstation (Muti Autolab/M204) with a built-in electrochemical impedance spectroscopy (EIS) analyzer. The measurement was conducted with a standard three-electrode cell for evaluating the activity of the samples from preparation example 1 and comparative preparation examples 2-8 as electrocatalysts in electrolyzing oxygen evolution reaction. The electrolyte is 1 M of KOH (Honeywell, a purity of more than 99%), and a platinum foil and Ag/AgCl (3 M of KCl) were used as a counter electrode and a reference electrode, respectively. Before the measurement, the Ag/AgCl electrode was calibrated. The potential ($E_{Ag/AgCl}$) was calibrated to the reversible hydrogen electrode (RHE) potential ($E_{RHE}$) according to the following Equation (1). The pH value of the electrolyte was measured by a PHM 201 pH meter.

$$E_{RHE} = E_{Ag/AgCl} + 0.1976 + 0.059 \times pH \quad (1)$$

Polarization curves were documented under the linear sweep voltammetry (LSV) mode with a sweep rate of 5 mV/s⁻¹. All the curves were corrected with 80% of IR compensation. The LSV curves of the samples from preparation example 1 and comparative preparation examples 2-8 were recorded in FIGS. 6A and 6B, and the LSV curve of the baseline of Ni foam was also shown in these figures. The Tafle plots of FIGS. 7A and 7B were derived from the LSV curves of FIGS. 6A and 6B, respectively. AC impedance was measured in a frequency range from $10^{-1}$ to $10^{-5}$ Hz with an AC amplitude of 10 mV. In order to obtain the average values and error margins, three independent electrodes were prepared and tested for each sample (preparation example 1 and comparative preparation examples 2-8). The results were recorded in the following Table 2, and the data were represented by standard deviation based on three tests.

TABLE 2

Comparison of the catalytic performance of OER between preparationexample 1 and comparative preparation examples 2-8

| Sample | η (mV) @ 100 mA/cm⁻² | Tafel slope (mV/dec) |
| --- | --- | --- |
| Preparation example 1 | 278 ± 5 | 40 ± 2 |
| Comparative preparation example 2 | 337 ± 4 | 75 ± 3 |
| Comparative preparation example 3 | 328 ± 6 | 56 ± 4 |
| Comparative preparation example 4 | 320 ± 5 | 55 ± 2 |
| Comparative preparation example 5 | 298 ± 3 | 42 ± 2 |
| Comparative preparation example 6 | 313 ± 8 | 50 ± 2 |
| Comparative preparation example 7 | 299 ± 3 | 48 ± 1 |
| Comparative preparation example 8 | 381 + 4 | 72 ± 3 |

Figure 6A:
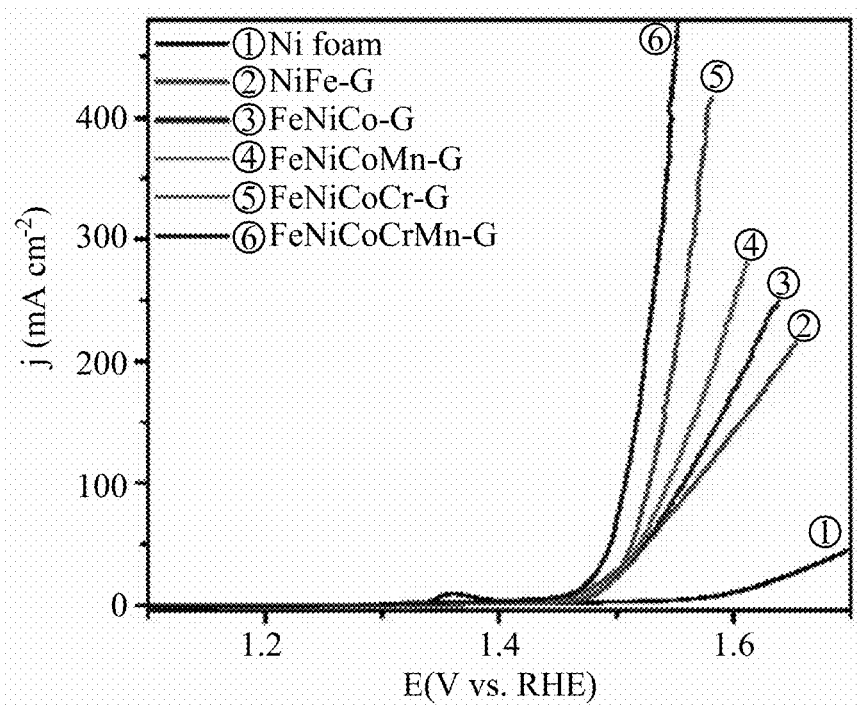
FIGS. 6A and 6B illustrate the linear sweep voltammetry (LSV) plots of electrodes prepared by the high-entropy composite glycerate of an embodiment of the present disclosure and the metal glycerates of comparative preparation examples.
Figure 7A:
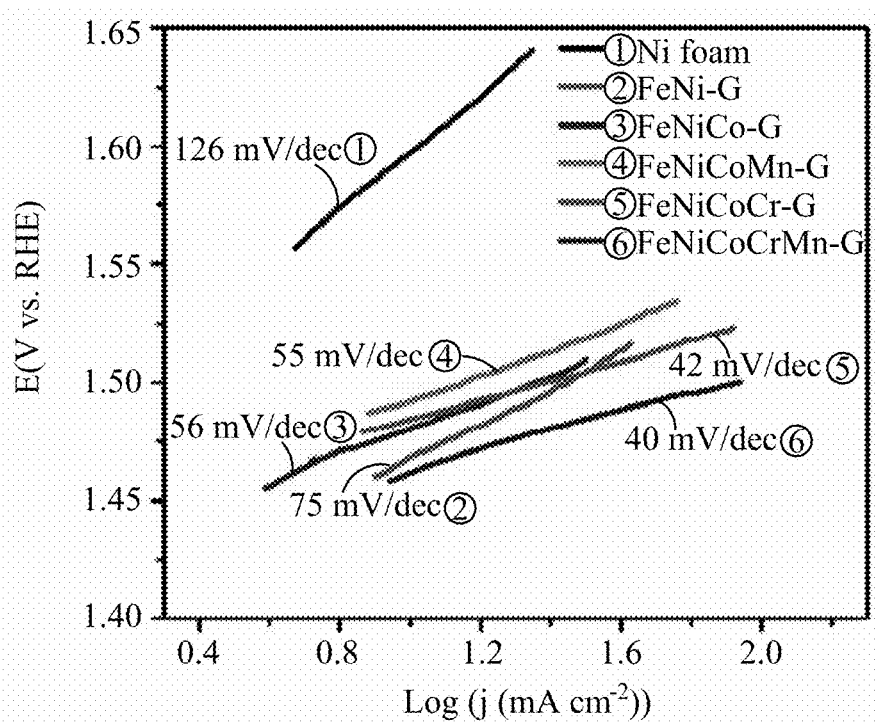
FIGS. 7A and 7B illustrate the Tafel plots of electrodes prepared by the high-entropy composite glycerate of an embodiment of the present disclosure and the metal glycerates of comparative preparation examples.
Figure 8A:
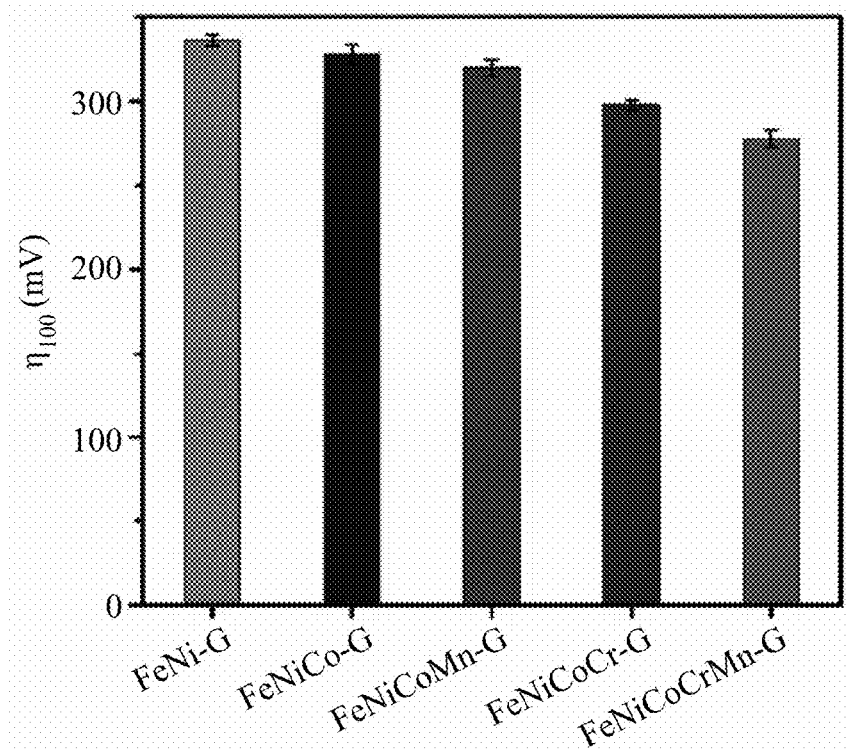
FIGS. 8A and 8B illustrate the bar graph of an overpotential ($\eta_{100}$) of electrodes prepared by the high-entropy composite glycerate of an embodiment of the present disclosure and the metal glycerates of comparative preparation examples at a current density of 100 mA/cm².

Referring to the LSV plot as shown in FIG. 6A, the Tafel plot as shown in FIG. 7A, the bar graph of the overpotential as shown in FIG. 8A and the catalytic performance as shown in Table 2, by comparing the high-entropy composite glycerate (preparation example 1) with the binary-metal glycerate, the ternary-metal glycerate, and the quarternary-metal glycerate (comparative preparation examples 2-5), it was demonstrated that the addition of metal elements can improve the performance of OER. As shown in FIG. 8A and Table 2, the high-entropy composite glycerate prepared in preparation example 1 (FeNiCoCrMn-G) had the overpotential of 278 mV at a current density of 100 mA/cm², which was the lowest overpotential, indicating that the high-entropy composite glycerate had the highest activity of electrocatalyzation. Accordingly, the order of the activity of electrocatalyzation from high to low was: FeNiCoCrMn-G (preparation example 1)>FeNiCoCr-G (comparative preparation example 5)>FeNiCoMn-G (comparative preparation example 4)>FeNiCo-G (comparative preparation example 3)>FeNi-G (comparative preparation example 2). The catalytic kinetics of the catalysts, i.e., the performance for catalyzing OER, were evaluated by the results shown in FIG. 7A and Table 2. The high-entropy composite glycerate prepared in preparation example 1 (FeNiCoCrMn-G) had the lowest Tafel slope (40 mV/dec), indicating that it exhibited the excellent performance for catalyzing OER. The order of the Tafel slope for catalyzing OER from low to high was: FeNiCoCr-G (comparative preparation example 5, 42 mV/dec)<FeNiCoMn-G (comparative preparation example 4, 55 mV/dec)<FeNiCo-G (comparative preparation example 3, 56 mV/dec)<FeNi-G (comparative preparation example 2, 75 mV/dec). In other words, in term of the kinetics of catalytic reaction, the order of the OER performance equaled to the order of the electrocatalytic activity. As such, the addition of Fe into mono-metal Ni glycerate (Ni-G) to form FeNi-G led to the modification of the electronic structure, and thus OER was improved. The electrocatalytic activity may be further increased by adding Co, another known OER active material, as a third element into FeNi-G to form FeNiCo-G, since Co had a higher electronegativity than Fe. Hence, Co was served as an electron acceptor, such that the Fe 2p peak in the XPS spectrum shifted positively, and the oxidation state of $Fe^{2+}$ was disappeared, leaving only the oxidation state of $Fe^{3+}$ in FeNiCo-G. Meanwhile, the electronic structure modification caused by the addition of Co led to a slight positive shift of the Ni 2p peak.

The Fe 2p peak may shift significantly by adding a fourth metal of Cr, while the Ni 2p peak may shift insignificantly by adding a fourth metal of Mn, indicating that the electrocatalystic activity was further increased, and the addition of Cr showed a higher degree of activity enhancement than the addition of Mn. Since the ionic radius of Cr is the largest among all the metal ions, the presence of Cr may cause compressive strain that was beneficial to OER reaction, which was attributed to weakened chemisorption at the active sites.

The addition of both of Cr and Mn to form FeNiCoCrMn-G may continue the positive peak shift, thereby enhancing the activity of OER. Therefore, the general trend is that the more the peak shift is, the lower the $\eta_{100}$ is, indicating that the electronic structure is gradually modified toward improving the OER activity. However, it was observed that with the addition of metals, the existing metal ions may have higher oxidation states, indicating the variation of local coordination environment that influences the OER performance.

Figure 6B:
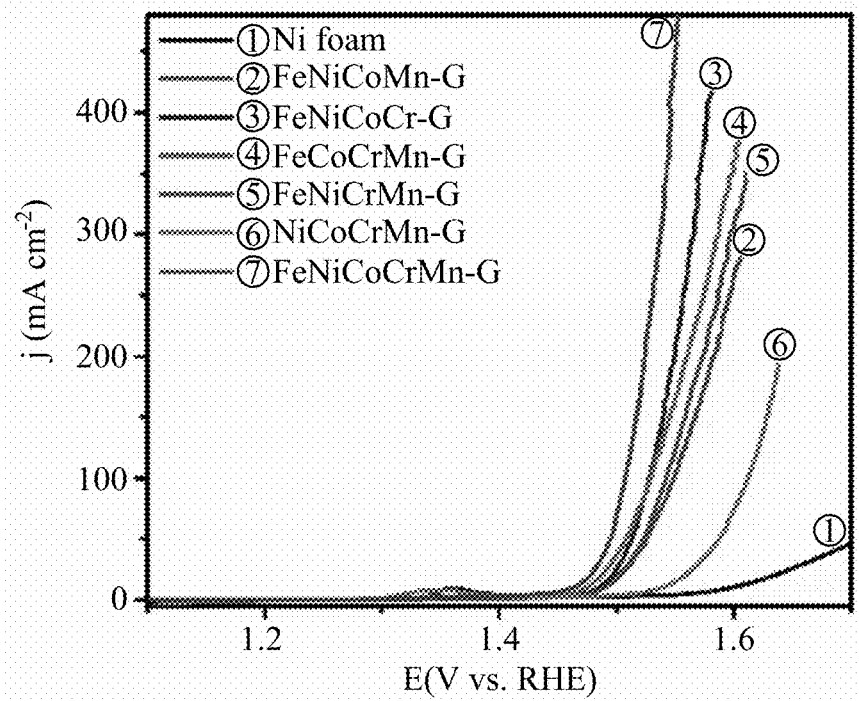
Figure 7B:
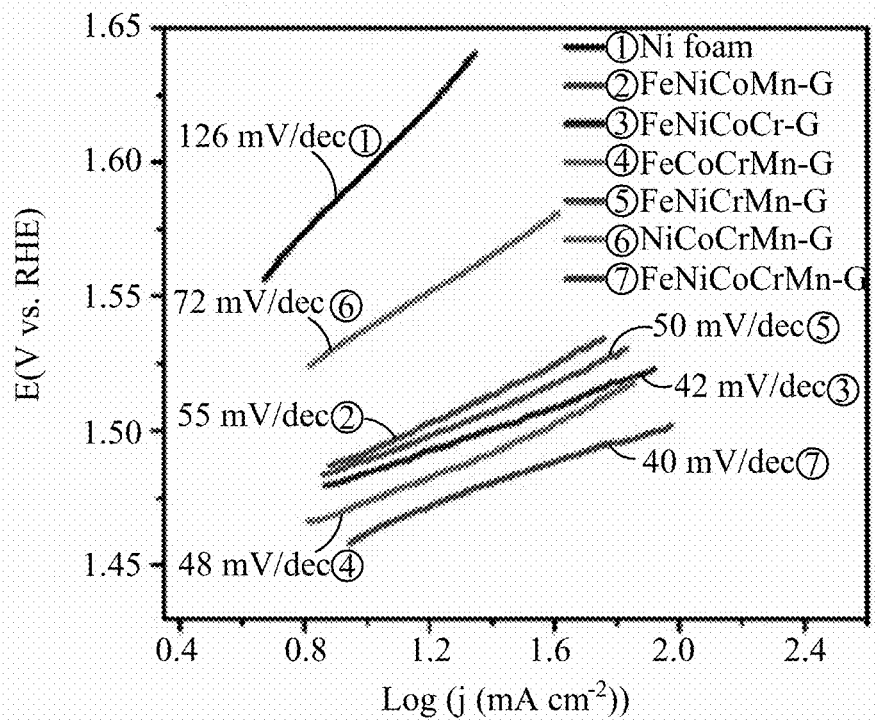
Figure 8B:
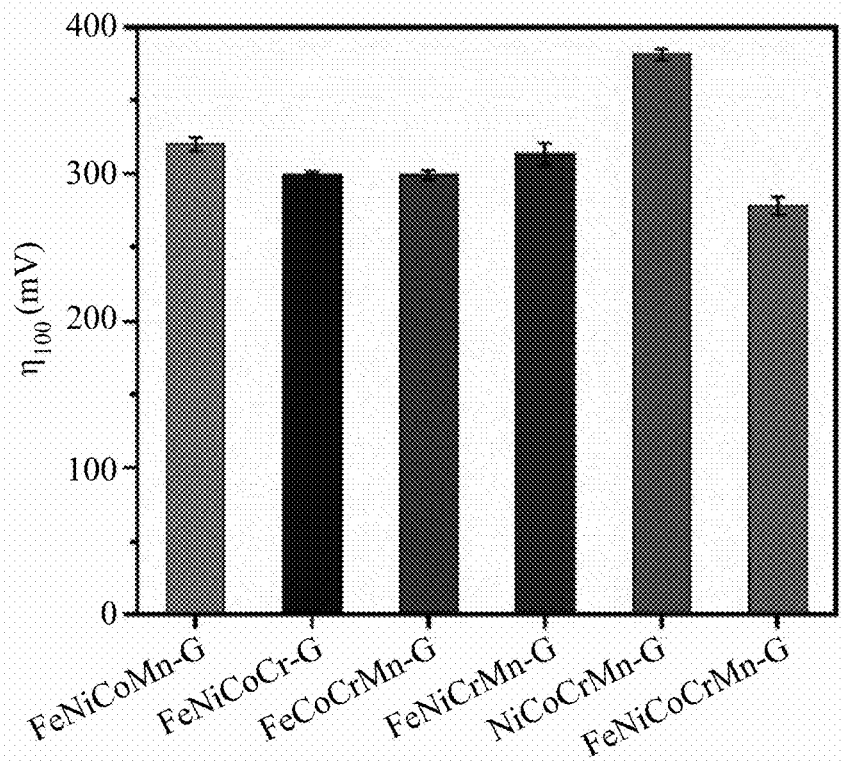

The synergistic effects resulted from the high-entropy configuration was demonstrated by comparing the high-entropy composite glycerate of the present disclosure (preparation example 1) with the quaternary-metal glycerates (comparative preparation examples 5-8), that is, by removing one metal from the high-entropy composite glycerate of the present disclosure. It was also demonstrated that the performance of the high-entropy composite glycerate of the present disclosure was high than other metal glycerates. Please refer to the LSV plot as shown in FIG. 6B, the Tafel plot as shown in FIG. 7B and the bar graph of the overpotential as shown in FIG. 8B, along with the catalytic performance as shown in Table 2. As mentioned above, the lower the overpotential is, the higher the electrocatalytic activity is, and the lower the Tafel slope is, the better the OER performance is. As shown in FIG. 8B and Table 2, the order of the electrocatalytic activity indicated by the overpotential from high to low was FeNiCoCrMn-G (preparation example 1, 278 eV)>FeNiCoCr-G (comparative preparation example 5, 298 eV)>FeCoCrMn-G (comparative preparation example 7, 299 eV)>FeNiCrMn-G (comparative preparation example 6, 313 eV)>FeNiCoMn-G (comparative preparation example 4, 337 eV)>NiCoCrMn-G (comparative preparation example 8, 381 eV). As shown in FIG. 7B and Table 2, the order of the OER performance indicated by the Tafel slope was FeNiCoCrMn-G (preparation example 1, 40 mV/dec)>FeNiCoCr-G (comparative preparation example 5, 42 mV/dec)>FeCoCrMn-G (comparative preparation example 7, 48 mV/dec)>FeNiCrMn-G (comparative preparation example 6, 50 mV/dec)>FeNiCoMn-G (comparative preparation example 4, 55 mV/dec)>NiCoCrMn-G (comparative preparation example 8, 72 mV/dec). In light of the foregoing, the high-entropy composite glycerate of the present disclosure had the excellent electrocatalytic activity and OER performance.

In addition, among the five kinds of quaternary-metal glycerates of comparative preparation examples 4-8, the performance of the quaternary-metal glycerate with the removal of Fe from the high-entropy composite glycerate of the present disclosure (FeNiCoCrMn-G) was the worst, indicating that Fe played a role in the OER activity of multiple metal glycerate. The performance of the quaternary-metal glycerate with the removal of Cr from FeNiCoCrMn-G was the second worst. It thus can be seen that in addition to the modification of the electronic structure, the strain effect also involved in the high-entropy glycerate.

Figure 9A:
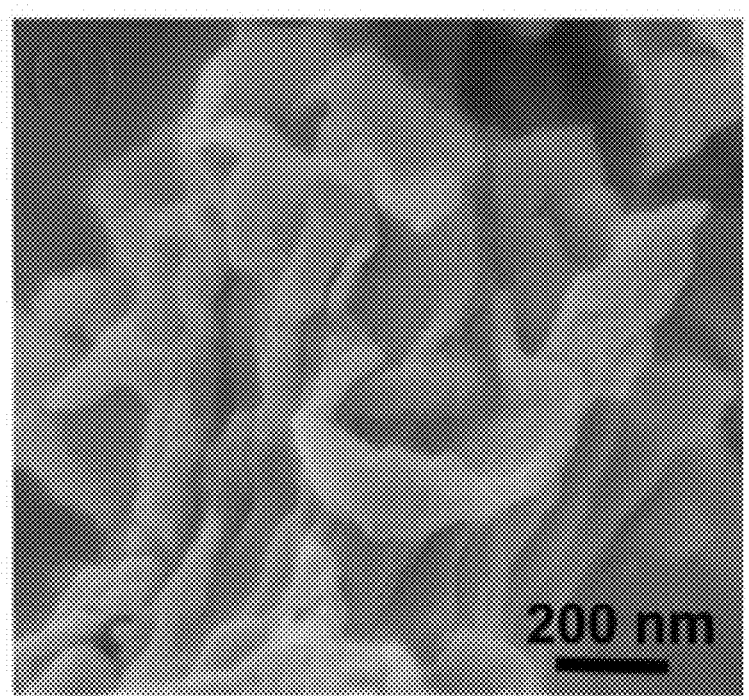
FIG. 9A illustrates the surface morphology of the high-entropy composite glycerate of an embodiment of the present disclosure after oxygen evolution reaction, which is examined by scanning electron microscopy (SEM).
Figure 9B:
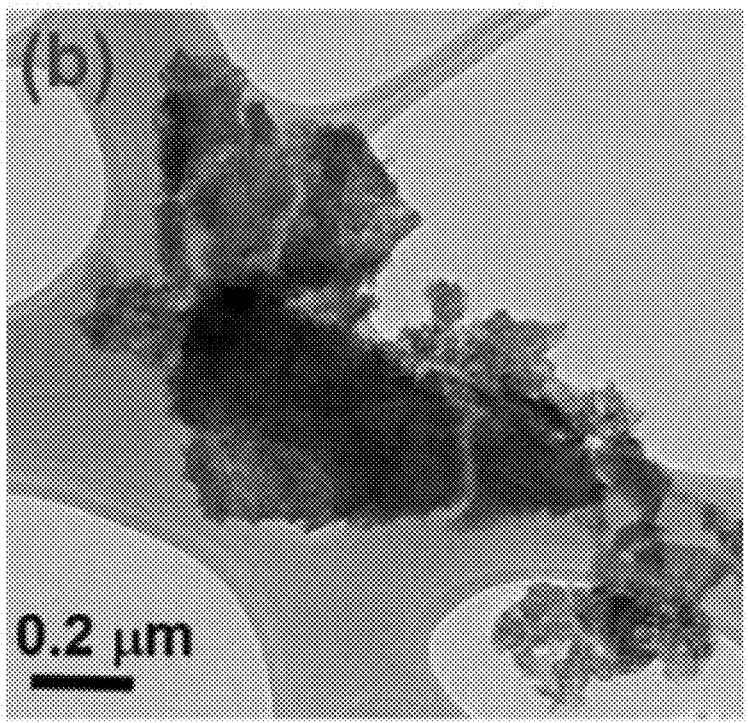
FIGS. 9B and 9C illustrate the surface morphology of the high-entropy composite glycerate of an embodiment of the present disclosure after oxygen evolution reaction, which is examined by transmission electron microscopy (TEM).
Figure 9C:
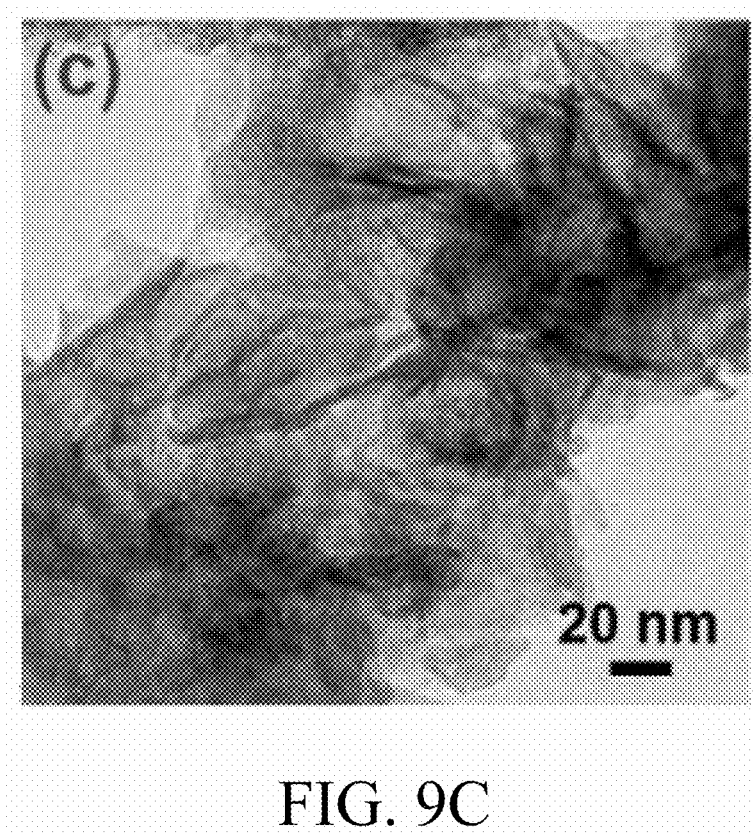
Figure 10:
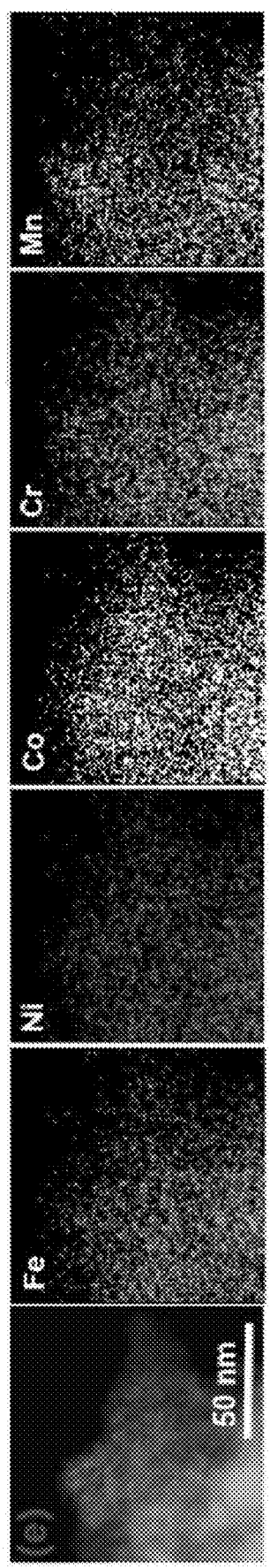
FIG. 10 illustrates the image of the high-entropy composite glycerate of an embodiment of the present disclosure examined by high-angle annular dark-field (HAADF) in combination with EDS.

After oxygen evolution reaction, the high-entropy composite glycerate of the present disclosure was examined by SEM and TEM. It can be seen in FIGS. 9A-9C that, after oxygen evolution reaction, the microsphere structure of the high-entropy composite glycerate was transformed into a thin, porous sheet-like structure. Moreover, as shown in FIG. 10, each of the metal elements was still homogenously distributed in the high-entropy composite glycerate after oxygen evolution reaction.

Figure 11A:
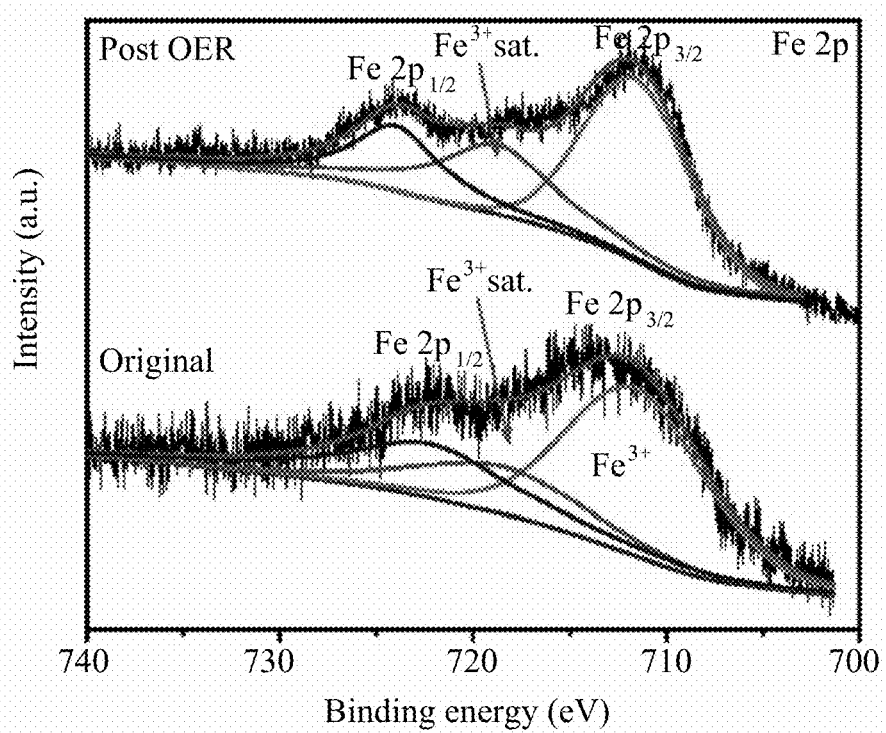
FIGS. 11A to 11F illustrate the spectrograms of X-ray photoelectron spectroscopy (XPS) of the high-entropy composite glycerate of an embodiment of the present disclosure after oxygen evolution reaction.
Figure 11B:
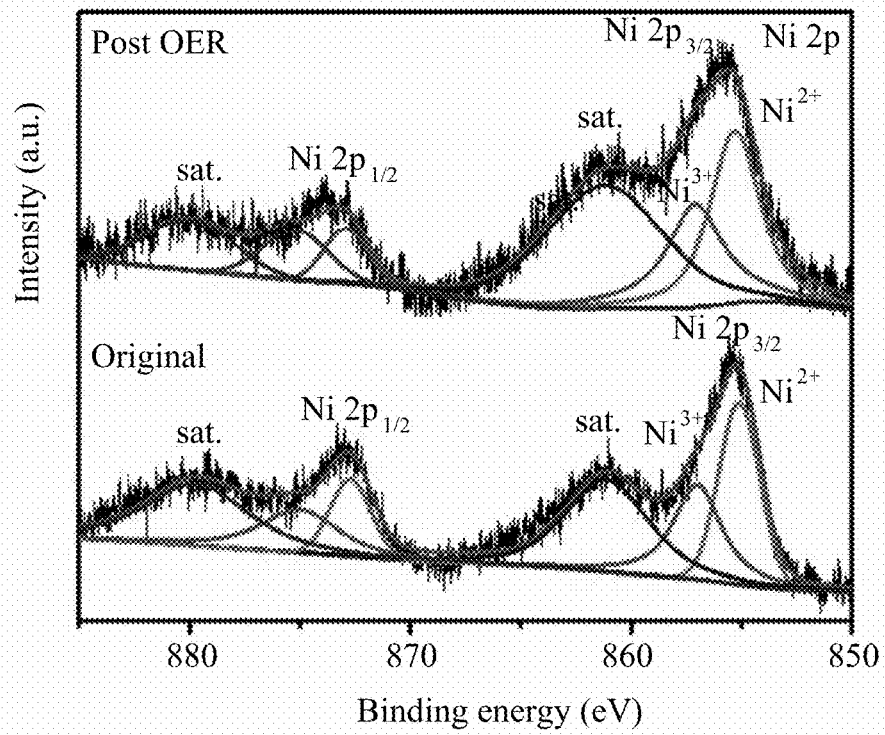
Figure 11C:
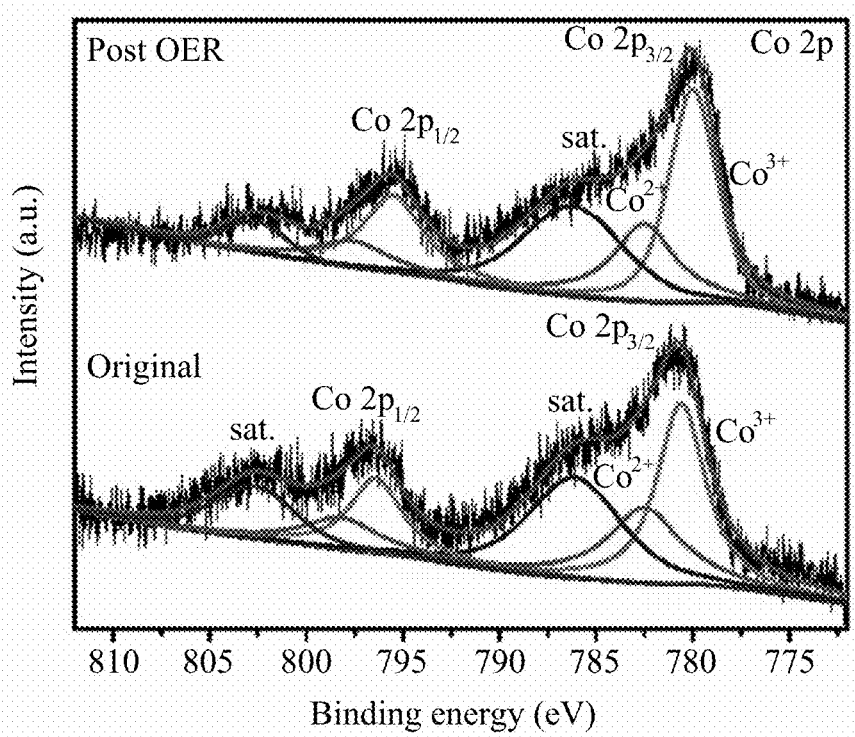
Figure 11D:
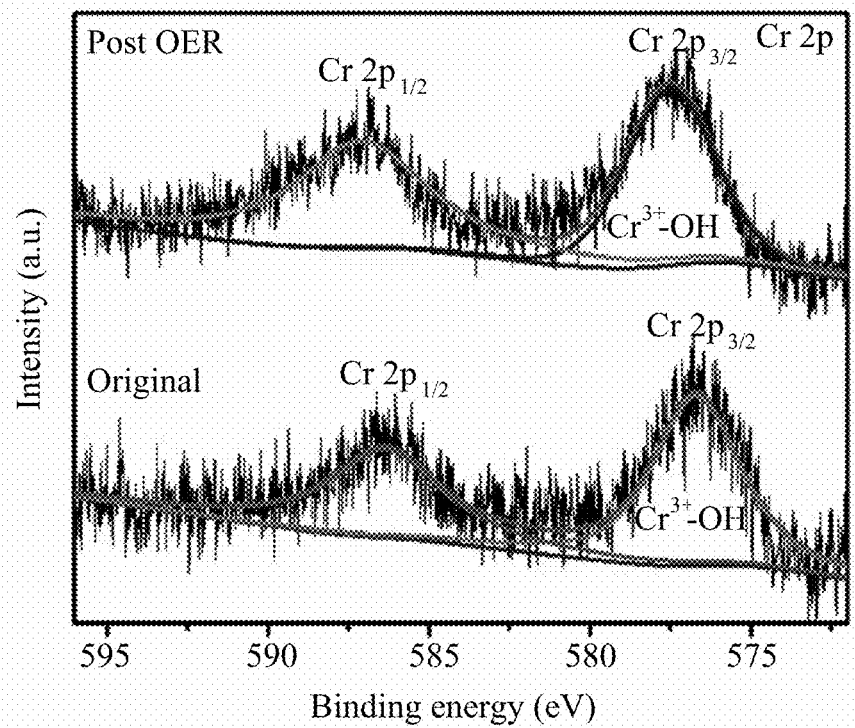
Figure 11E:
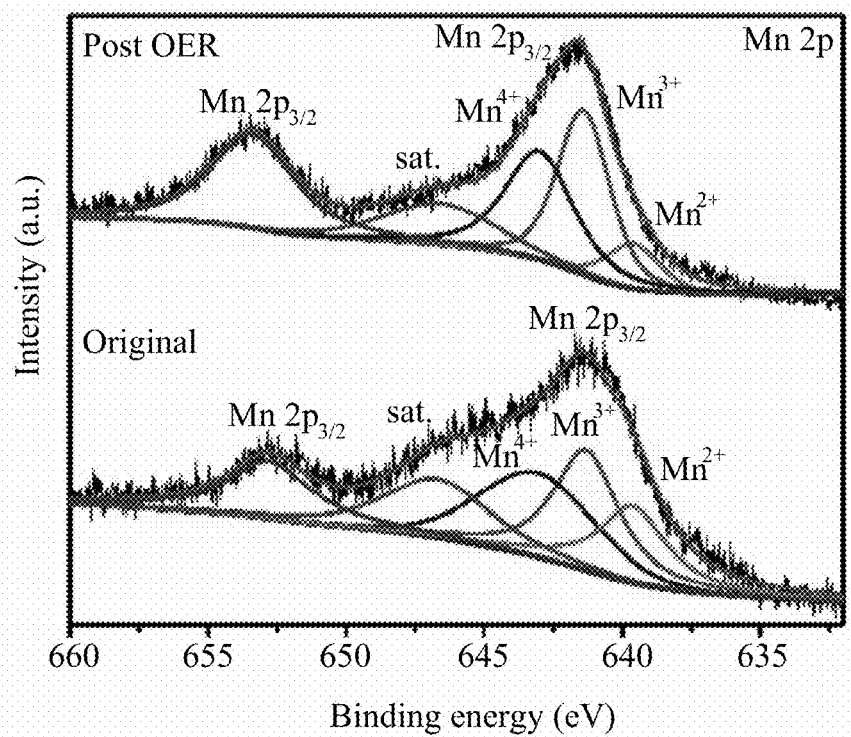
Figure 11F:
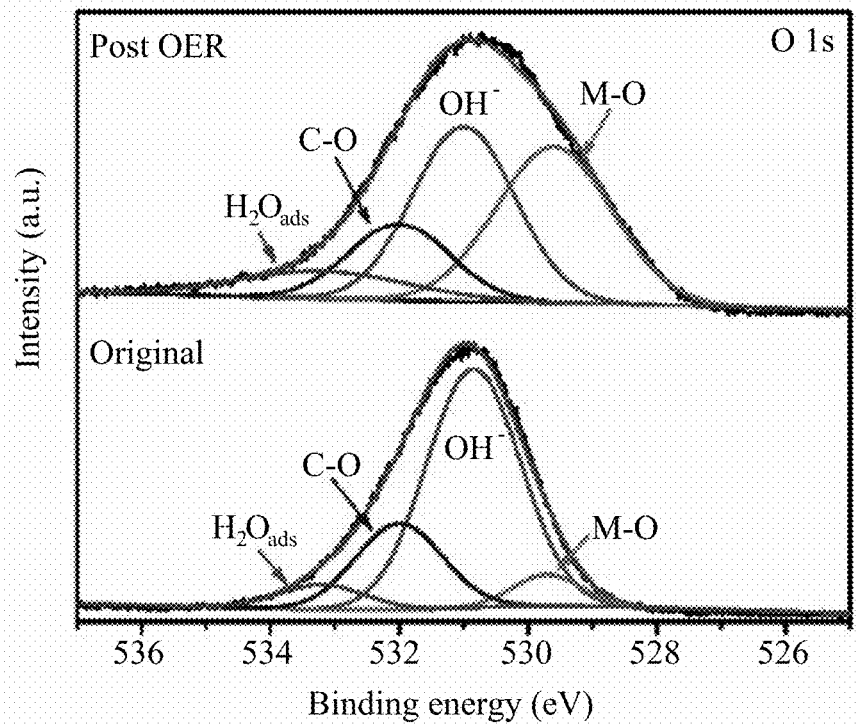

Furthermore, for comparing the change of the oxidation states of the metal elements in the high-entropy composite glycerate, please refer to FIGS. 11A-11F. As shown in FIG. 11A, the Fe 2p spectrum remained unchanged with the presence of only $Fe^{3+}$. In FIGS. 11B and 11C, the intensities of the $Ni^{3+}$ and $Co^{3+}$ peaks were slightly increased. The Cr spectrum as shown in FIG. 11D indicated a positive peak shift. The Cr $2p_{3/2}$ peak and the Cr $2p_{1/2}$ peak, belonging to $Cr^{3+}$, were located at 577.5 eV and 587.2 eV, respectively. It was observed in FIG. 11E that $Mn^{2+}$ was partially oxidized to higher oxidation states, and the increased metal of $3^+$ oxidation state represented the formation of metal oxyhydroxides. Furthermore, the O 1s spectrum of FIG. 11F showed a clear transition. Before oxygen evolution reaction, the peak of the O—H bonding was 531.3 eV, which was the highest intensity. After oxygen evolution reaction, the intensity of O-M bonding increased to 529.6 eV. For example, the ratio of intensity of O-M and O—H (O-M/O—H) was approximately 1 after oxygen evolution reaction. With the results shown in FIG. 11F, it was demonstrated that the aforementioned metal oxyhydroxides were formed in the high-entropy composite glycerate of the present disclosure during oxygen evolution reaction. In view of the above, the properties of the glycerate and the synergetic effect of the high-entropy glycerate render the excellent activity of oxygen evolution reaction to the high-entropy composite glycerate of the present disclosure. Additionally, it is believed that the high-entropy composite glycerate of the present disclosure (FeNiCoCrMn-G) can be further modified through adjusting the concentration of the precursor and/or adding more than five kinds of metals, thereby further improving the activity of oxygen evolution reaction and water-splitting of the high-entropy composite glycerate.

Figure 12:
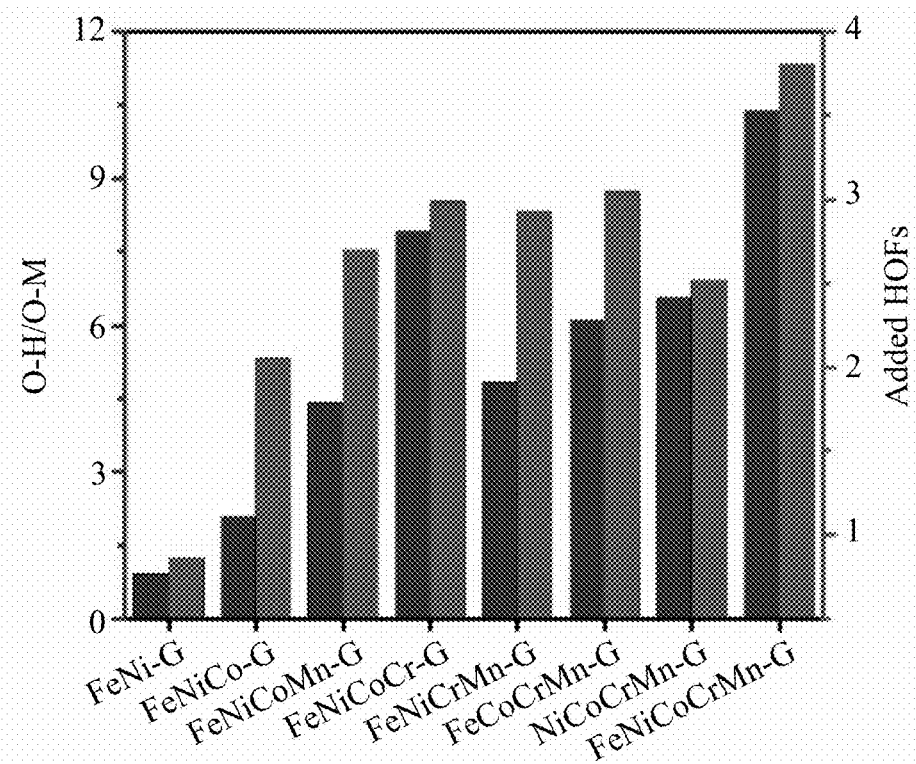
FIG. 12 illustrates the bar graph of the ratio of O—H/O-M and the added higher oxidation-state fractions (HOFs) of the high-entropy composite glycerate of an embodiment of the present disclosure and the metal glycerates of comparative preparation examples.
Figure 13:
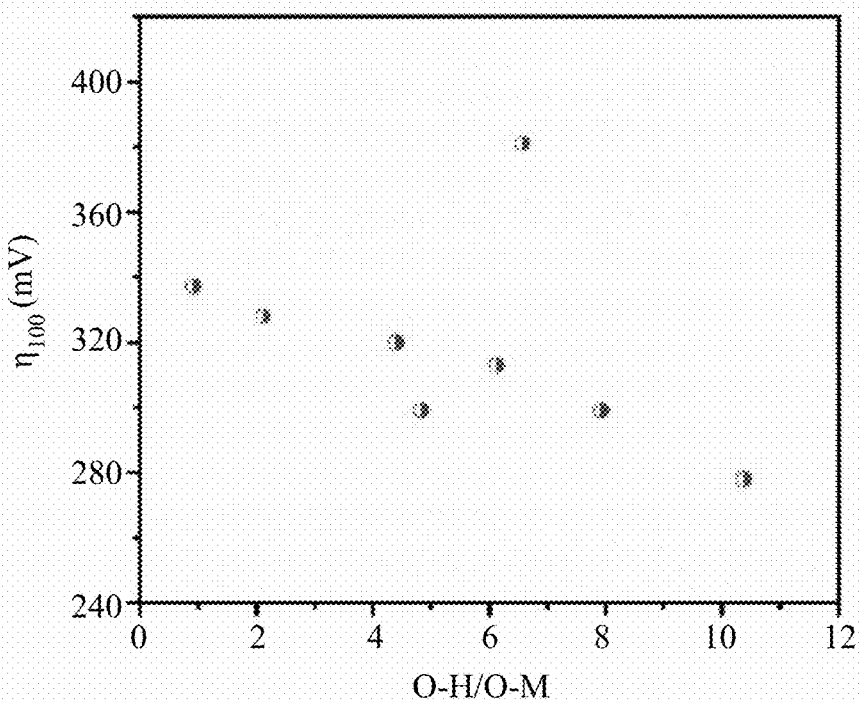
FIG. 13 illustrates the ratio of O—H/O-M of the high-entropy composite glycerate of an embodiment of the present disclosure and the metal glycerates of comparative preparation examples and an overpotential (limo) at a current density of 100 mA/cm² of the electrodes prepared thereby.

Please refer to FIG. 12. In the bar graph of each sample, the left bars represented O—H/O-M, and the right bars represented the added higher oxidation-state fractions, i.e., HOFs. The HOF, $(M^{3+}+M^{4+})/(M^{2+}+M^{3+}+M^{4+})$, of each metal M was analyzed by XPS. The added HOFs in all metals of each of the samples (i.e., preparation example 1 and comparative preparation examples 2-8) were showed in the right bars of FIG. 12. The added HOF of the high-entropy composite glycerate of the present disclosure was the highest, followed by the quaternary-metal glycerates, the ternary-metal glycerates, and the binary-metal glycerates. For the glycerates, the numbers of coordinate covalent bonding between the metals and ligands depended on the oxidation states of the metals. In other words, the metals having oxidation states of $3^+$ and $4^+$ may have three and four attached ligands, respectively. As shown in the left bars of FIG. 12, with the added HOFs increased, the ratio of O—H/O-M may increase as well. As shown in FIG. 13, it was demonstrated that the electrocatalytic activity may be enhanced with the increase of O—H as the coordination environment was changed. The resulting coordinate covalent bonding may render more freedoms to the glycerate anions to flip the coordination mode, and therefore facilitate OER. The exception was the metal glycerate without Fe, i.e., NiCoCrMn-G. Despite the fact that NiCoCrMn-G had a high ratio of O—H/O-M, the overpotential ($\eta_{100}$) thereof was still pretty high due to removal of Fe.

Also, it was expected that crystalline distortion (expanding) may occur in the metal glycerate having higher oxidation states or more coordinate covalent bonding. As shown in FIG. 3A, the addition of Co into FeNi-G may decrease the peak intensity, and the addition of Mn into FeNiCo-G may further decrease the peak intensity, indicating the expanding of the interlayers in the layered structure of the metal glycerates. It was also demonstrated that more active sites can accelerate the charge transfer between the intermediates and the active sites.

Moreover, hydrogen evolution reaction (HER) of the high-entropy composite glycerate of preparation example 1 and the metal glycerates of comparative preparation examples 2-8 in the 1 M KOH electrolyte were evaluated and documented in the following Table 3. The data provided in Table 3 were represented by standard deviation based on three tests.

TABLE 3

Comparison of HER catalytic performance between preparation example 1 and comparative preparation examples 2-8

|  | η (mV) @ 10 mA/cm$^{-2}$ | Tafel slope (mV/dec) |
| --- | --- | --- |
| Preparation example 1 | 210 ± 4 | 105 ± 3 |
| Nickel foam | 255 ± 4 | 132 ± 4 |
| Comparative preparation example 2 | 224 ± 5 | 192 ± 6 |
| Comparative preparation example 3 | 254 ± 5 | 137 ± 5 |

TABLE 3-continued

Comparison of HER catalytic performance between preparation example 1 and comparative preparation examples 2-8

|  | η (mV) @ 10 mA/cm$^{-2}$ | Tafel slope (mV/dec) |
| --- | --- | --- |
| Comparative preparation example 4 | 251 ± 6 | 130 ± 4 |
| Comparative preparation example 5 | 273 ± 3 | 116 ± 5 |
| Comparative preparation example 6 | 241 ± 2 | 119 ± 3 |
| Comparative preparation example 7 | 259 ± 3 | 122 ± 3 |
| Comparative preparation example 8 | 268 + 8 | 113 + 4 |

As shown in Table 3, the high-entropy composite glycerate of the present disclosure had the excellent performance, which was indicated by the lowest overpotential of 210 mV at a current density of 10 mA/cm$^2$ and the lowest Tafel slope of 105 mV/dec.

Further, in order to determine the stability and durability of the high-entropy composite glycerate of preparation example 1 of the present disclosure for catalyzing OER, the continuous CV cycling at a scan rate of 100 mV/s for 3,000 cycles was used. The activities of OER were recorded when the selected cycles were reached (1, 1,000, 2,000, and 3,000 cycles). After 1,000 cycles, the activities of OER for all samples were increased, except for FeNiCoCr-G. After 2,000 cycles, the binary-metal glycerates, ternary-metal glycerates, and quaternary-metal glycerates showed decreased activities of OER. Nevertheless, FeNiCoCrMn-G of preparation example 1 exhibited higher activity of OER after 3,000 cycles. It was demonstrated that the electrode prepared by the high-entropy composite glycerate of the present disclosure had excellent electrochemical stability, and exhibited the synergistic effect of high-entropy configuration. In addition, the long-term durability of the working electrodes was evaluated by chronopotentiometry at a current density of 10 mA/cm$^{-2}$ and 100 mA/cm$^{-2}$ for 36 hours. As a result, FeNiCoCrMn-G exhibited no significant change after 36 hours, indicating that FeNiCoCrMn-G had excellent durability. That is to say, the high-entropy composite glycerate of the present disclosure as an electrocatalyst is highly stable during oxygen evolution reaction.

On the other hands, the overall water-splitting performance of the high-entropy composite glycerate of the present disclosure in a high-entropy composite glycerate (HEG) electrolytic cell was examined by a two-electrode system. As a result, the cell voltage was 1.63 V at a current density of 10 mA/cm$^{-2}$, indicating that the HEG electrolytic cell had good overall water-splitting performance. Moreover, the LSV curve of the high-entropy composite glycerate of the present disclosure in the HEG electrolytic cell showed no significant change after continuous testing for 24 hours, indicating the long-term durability. The above excellent performances of the cycling stability and durability were derived from the essence of the high-entropy composite entropy itself.

While several embodiments have been described and illustrated herein, those of ordinary skill in the art will readily envision a variety of other means for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the applications for which this disclosure is used. Those skilled in the art will recognize, or be able to ascertain using no more than routine experimentation, many equivalents to the embodiments described herein. It is, therefore, to be understood that the foregoing embodiments are presented by way of example only and that, within the scope of the appended claims and equivalents thereto, embodiments may be practiced otherwise than as described and claimed.

What is claimed is:

1. A high-entropy composite glycerate represented by Formula (I) below:

$$NiCrFeCoMn(C_3H_5O_4)_n \qquad (I),$$

wherein n is a positive integer from 1 to 3, and
wherein each of the Ni, Cr, Fe, Co, and Mn has an atom percent between 5 and 35 based on a total amount of the Ni, Cr, Fe, Co, and Mn.

2. The high-entropy composite glycerate according to claim 1, wherein each of the Ni, Cr, Fe, Co, and Mn forms a metal glycerate with the glycerate anions, and the metal glycerate has layered structures.

3. The high-entropy composite glycerate according to claim 2, wherein the layered structures formed from the Ni, Cr, Fe, Co, and Mn with the glycerate anions are stacked upon each other and allow the high-entropy composite glycerate to have a particle structure.

4. The high-entropy composite glycerate according to claim 1, wherein each of the Ni, Cr, Fe, Co, and Mn is homogenously distributed within the high-entropy composite glycerate.

5. A method for preparing the high-entropy composite glycerate according to claim 1, comprising:
    performing a solvothermal reaction of a reaction solution comprising a precursor dissolved therein and glycerol, wherein the precursor comprises a Ni$^{2+}$ metal salt, a Co$^{2+}$ metal salt, a Cr$^{3+}$ metal salt, a Mn$^{2+}$ metal salt, and a Fe$^{3+}$ metal salt; and
    separating the high-entropy composite glycerate from the reaction solution after the solvothermal reaction.

6. The method according to claim 5, wherein the reaction solution is prepared by dissolving the precursor in isopropanol and adding the glycerol into the isopropanol dissolved with the precursor, wherein a weight ratio of the glycerol to the isopropanol is from 1:2 to 1:5.

7. The method according to claim 5, wherein the solvothermal reaction is performed at a temperature of 140° C. to 200° C. for 6 to 16 hours.

8. The method according to claim 5, wherein a metal salt of each of the Ni$^{2+}$ metal salt, the Co$^{2+}$ metal salt, the Cr$^{3+}$ metal salt, the Mn$^{2+}$ metal salt, and the Fe$^{3+}$ metal salt is independently selected from the group consisting of a metal nitrate, a metal halide, a metal acetate, and a metal sulfate, and the metal salts in the reaction solution have the same mole number.

9. The method according to claim 5, wherein a molar ratio of the precursor to the glycerol is from 1:10 to 1:20, and a molar ratio of each of the Ni$^{2+}$ metal salt, the Co$^{2+}$ metal salt, the Cr$^{3+}$ metal salt, the Mn$^{2+}$ metal salt, and the Fe$^{3+}$ metal salt to the glycerol is from 0.01 to 1.

10. An electrocatalyst for electrolyzing water, comprising the high-entropy composite glycerate according to claim 1.

* * * * *